Feb. 1, 1966   F. FORSBERG   3,232,798
METHOD OF CONTROLLING YIELD POINT OF STEEL AND THE PRODUCT
Filed Aug. 12, 1964   12 Sheets-Sheet 1

INVENTOR.
FRANK FORSBERG
BY
Kenway, Jenney & Hildreth
ATTORNEYS

Feb. 1, 1966            F. FORSBERG            3,232,798
METHOD OF CONTROLLING YIELD POINT OF STEEL AND THE PRODUCT
Filed Aug. 12, 1964            12 Sheets-Sheet 2

INVENTOR.
FRANK FORSBERG
BY
ATTORNEYS

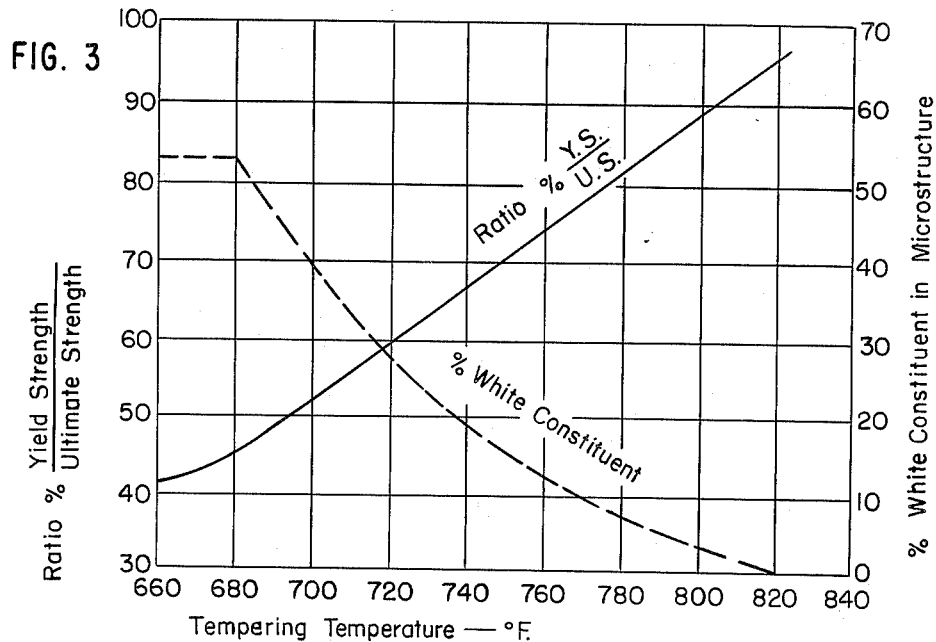
FIG. 3
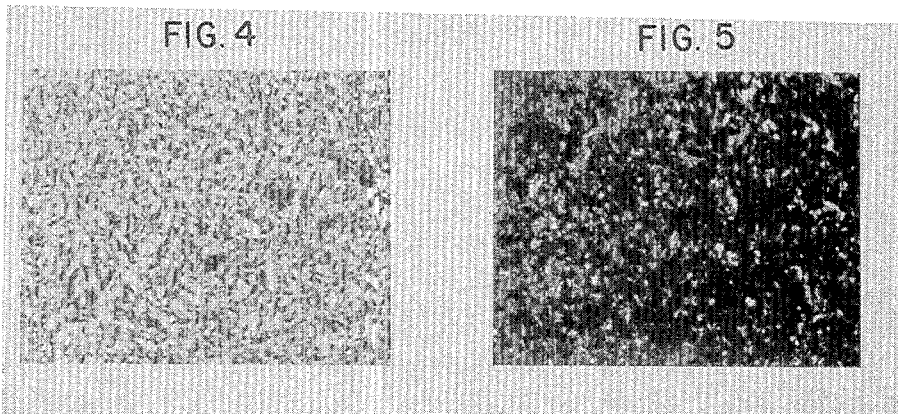
INVENTOR
FRANK FORSBERG
BY
ATTORNEYS

Feb. 1, 1966 F. FORSBERG 3,232,798
METHOD OF CONTROLLING YIELD POINT OF STEEL AND THE PRODUCT
Filed Aug. 12, 1964 12 Sheets-Sheet 4
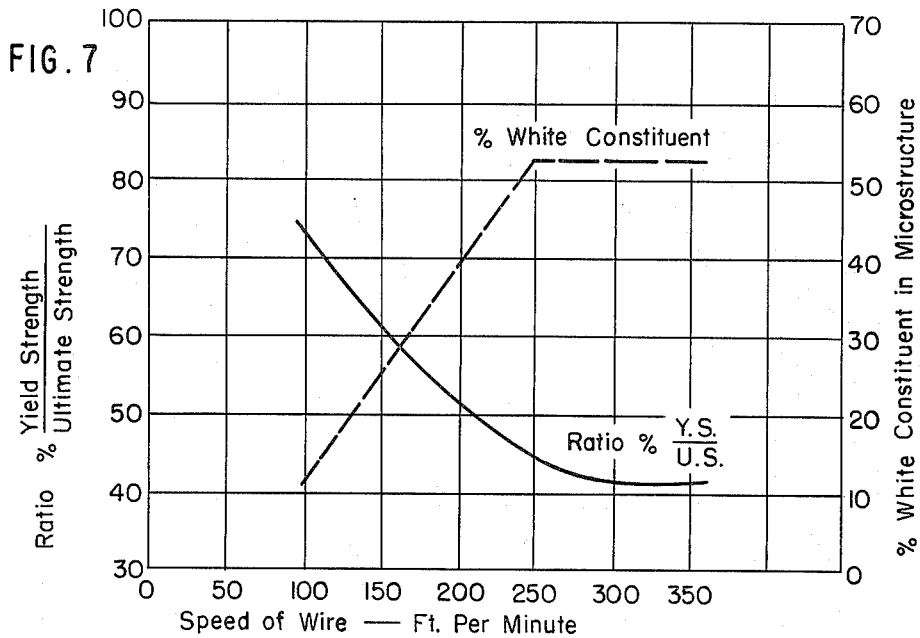
FIG. 7
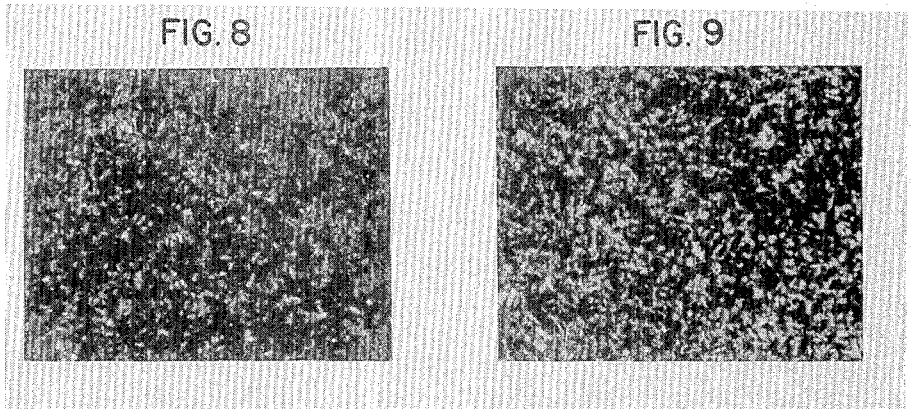
FIG. 8  FIG. 9
FIG. 10
INVENTOR
FRANK FORSBERG
BY
ATTORNEYS

INVENTOR
FRANK FORSBERG

Feb. 1, 1966  F. FORSBERG  3,232,798
METHOD OF CONTROLLING YIELD POINT OF STEEL AND THE PRODUCT
Filed Aug. 12, 1964  12 Sheets-Sheet 7

INVENTOR.
FRANK FORSBERG
BY
Kenway, Jenney & Hildreth
ATTORNEYS

Feb. 1, 1966  F. FORSBERG  3,232,798
METHOD OF CONTROLLING YIELD POINT OF STEEL AND THE PRODUCT
Filed Aug. 12, 1964  12 Sheets-Sheet 9
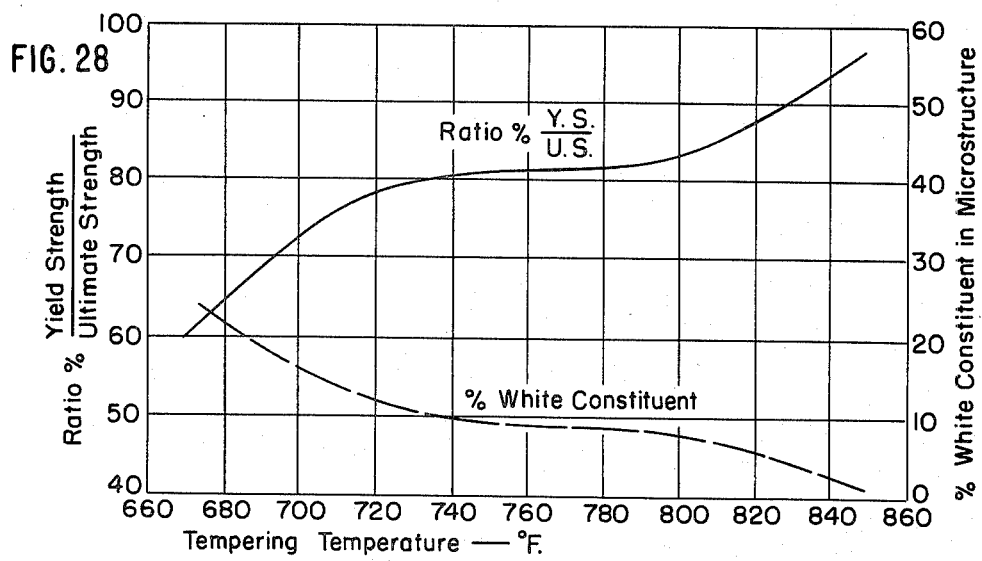
FIG. 28
FIG. 29
FIG. 30
FIG. 31
INVENTOR.
FRANK FORSBERG
BY
Kenway, Jenney & Hildreth
ATTORNEYS

*INVENTOR.*
FRANK FORSBERG
BY
*ATTORNEYS*

Feb. 1, 1966  F. FORSBERG  3,232,798
METHOD OF CONTROLLING YIELD POINT OF STEEL AND THE PRODUCT
Filed Aug. 12, 1964  12 Sheets-Sheet 11
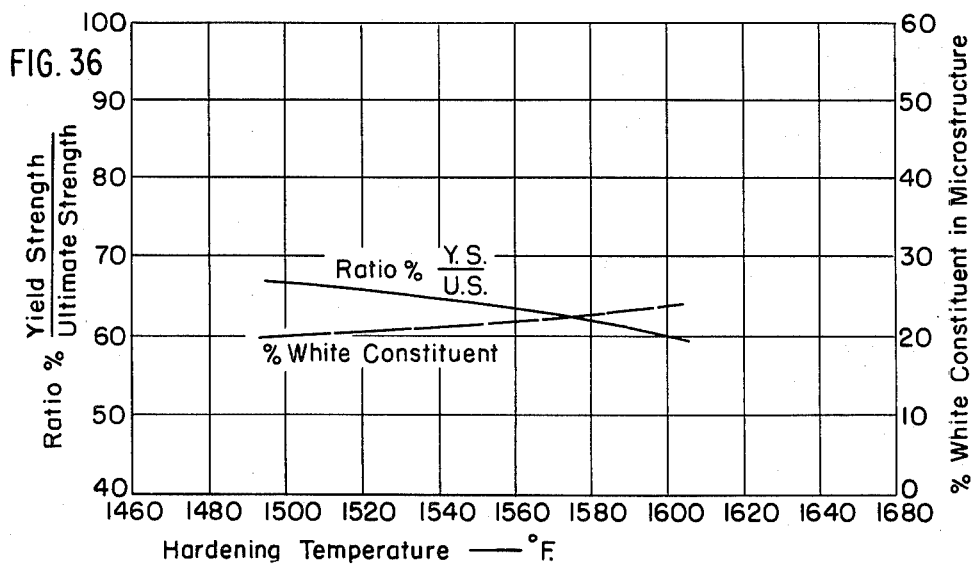
FIG. 36
FIG. 37
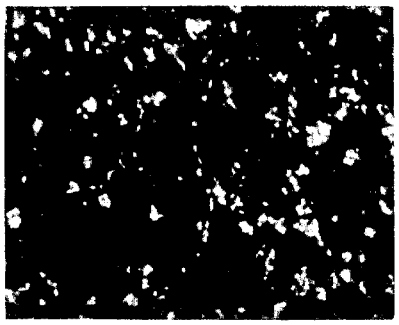
FIG. 38
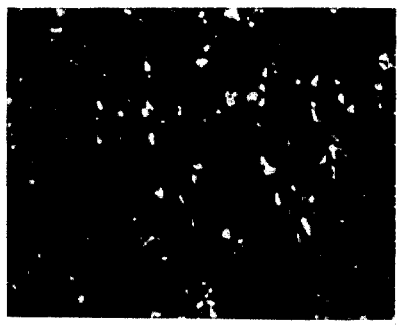
FIG. 39
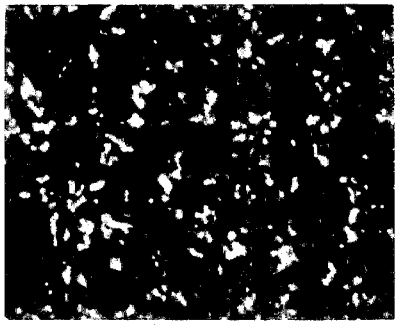
INVENTOR.
FRANK FORSBERG
BY
Kenway, Jenney & Hildreth
ATTORNEYS

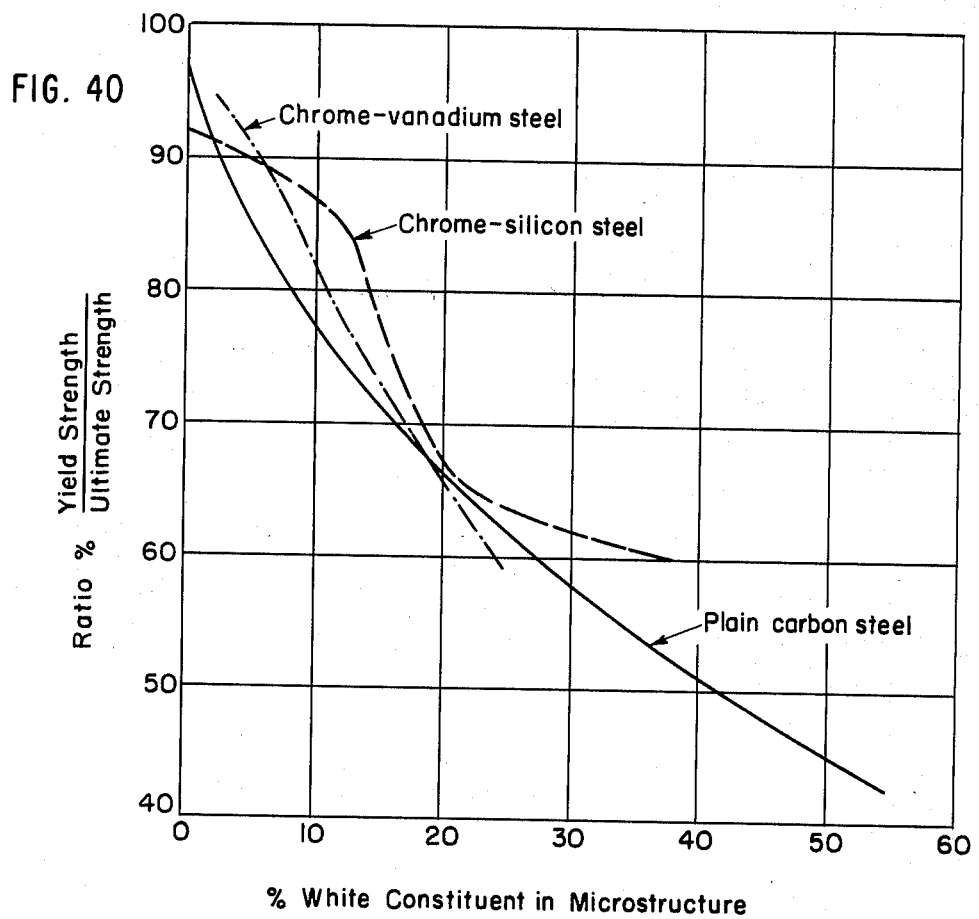

United States Patent Office 3,232,798
Patented Feb. 1, 1966

3,232,798
METHOD OF CONTROLLING YIELD POINT OF STEEL AND THE PRODUCT
Frank Forsberg, Worcester, Mass., assignor to Thompson Wire Company, Mattapan, Mass., a corporation of Massachusetts
Filed Aug. 12, 1964, Ser. No. 390,260
23 Claims. (Cl. 148—143)

This application is a continuation-in-part of application Serial No. 124,843, now forfeited, entitled "Method of Controlling Yield Point of Steel and the Product" filed by Frank Forsberg on July 18, 1961.

This invention relates to the heat treating of steel, and more particularly, to a novel and improved hardening and tempering process for steel and to a novel product of the process.

Conventional oil-tempered, high carbon steel products, such as steel wires, can be produced with ultimate tensile strengths approaching 350,000 p.s.i. A typical yield strength for such a steel would be approximately 80% of ultimate strength. Hypoeutectoid steels of low to moderate carbon content can exhibit ultimate tensile strengths of slightly over 300,000 p.s.i. The yield strength for these oil-tempered, moderate-carbon steels is usually an even higher percent; for example, 90% or more, of the ultimate strength of the steel. For many applications, it is desirable to have a yield strength which is a lesser percentage of the ultimate strength of the steel. However, conventional processing does not include control of the yield-to-ultimate strength ratio, either in the initial heat treating or subsequently.

It is the primary object of this invention to provide a novel and improved hardening and tempering process for steel whereby the yield strength of the steel may be controlled.

It is a further object of the present invention to provide a novel and improved process for hardening and tempering steel, whereby a steel is provided which has a higher ultimate strength, and a relatively low yield strength and increased elongation.

Another object is to provide a novel process of the type described whereby the yield to ultimate strength ratio of the steel may be controlled within wide limits.

Another object is to provide a novel process of the type described whereby steel is hardened and tempered to provide a materially decreased yield to ultimate strength ratio and whereby, subsequently, the steel may be further treated to increase its yield to ultimate strength ratio.

Another object is to provide plain carbon and low alloy steels which have a yield to ultimate strength ratio which is materially lower than conventional low carbon steels, which have improved fatigue strength and which have increased elongation.

Still another object is to provide plain carbon and low alloy steels having low yield to ultimate strength ratios which may be subsequently increased to normal yield to ultimate strength ratios.

Further objects and advantages will be apparent and will be specifically discussed in the following description.

Briefly, the novel process of this invention is one by which the resulting steel is believed to include a substantial amount of untempered martensite forming a sub-matrix containing retained austenite, with the sub-matrix being within a background matrix of tempered martensite. The sub-matrix of untempered martensite and its contained retained austenite, for reasons which will be apparent and further described hereinafter, will be referred to as the "white constituent." The steps of the novel process of this invention comprise the austenitizing of the steel, cooling the steel at the critical rate for the transformation of a portion of the austenite to martensite, immediately tempering the martensite formed, and cooling the steel, whereby untempered martensite is formed. This general as well as other more specific objects of the invention are more fully set forth in the following description which should be considered in conjunction with the following drawings, wherein:

FIG. 3 is a chart showing plots of the ratio of yield strength to ultimate strength, and percent of "white constituent" as a function of tempering temperature of a wire product processed in accordance with this invention;

FIG. 4 is a photomicrograph of a product of the invention tempered at 680° F.;

FIG. 5 is a photomicrograph of a product of this invention tempered at 740° F.;

FIG. 6 is a photomicrograph of a product of this invention tempered at 800° F.;

FIG. 7 is a chart showing plots of the ratio of yield strength to ultimate strength, and percent of white constiutent as a function of wire speed of a wire processed in accordance with this invention;

FIG. 8 is a photomicrograph of a product of this invention produced at a wire speed of 100 feet per minute;

FIG. 9 is a photomicrograph of a product of this invention produced at a wire speed of 200 feet per minute;

FIG. 10 is a photomicrograph of a product of this invention produced at a wire speed of 300 feet per minute;

FIG. 28 is a chart showing plots of the ratio of yield strength to ultimate strength, and percent of white constituent as a function of tempering temperature of a chrome vanadium wire product produced in accordance with this invention.

FIG. 29 is a photomicrograph of a chrome vanadium product of the invention tempered at 680° F.

FIG. 30 is a photomicrograph of a chrome vanadium product of this invention tempered at 760° F.

FIG. 31 is a photomicrograph of a chrome vanadium product of this invention tempered at 840° F.

FIG. 36 is a chart showing plots of the ratio of yield strength to ultimate strength and percent of white constituent all as a function of hardening temperature of a chrome vanadium wire product processed in accordance with this invention.

FIG. 37 is a photomicrograph of a chrome vanadium product of this invention produced with a hardening temperature of 1500° F.

FIG. 38 is a photomicrograph of a chrome vanadium product of this invention produced with a hardening temperature of 1550° F.

FIG. 39 is a photomicrograph of a chrome vanadium product of this invention produced at a hardening temperature of 1600° F.

FIG. 40 is a curve showing ratios of yield to ultimate strength of plain carbon, chrome silicon and chrome vanadium steel products produced by the process of this invention as a function of the percent of white constituent.

Figure 1:
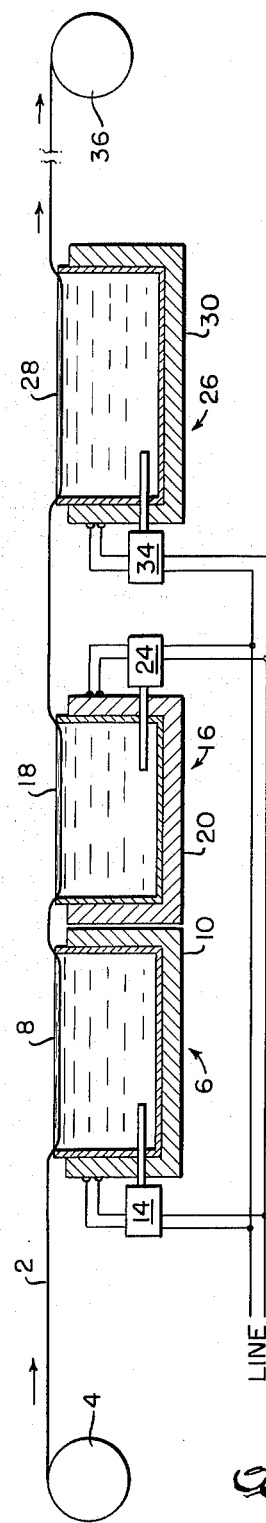
FIG. 1 is a schematic diagram of equipment for the heat treating process.

Referring to FIG. 1, there is shown conventional heat treating equipment suitable for use with the present invention. While also suitable for use with other products, the equipment is shown arranged for the treatment of wire or strip products. The wire 2 is fed from a conventional pay-off device 4. The wire 2 first passes into a hardening vessel 6 filled with hot lead 8. Alloy cast-steel is a suitable material for such vessels. The vessel 6 is provided with a temperature-controlling jacket 10. The temperature is maintained by conventional thermostatic means, utilizing electrical or gas energization. A source of electrical power is controlled by a thermostat 14. After leaving the first vessel, commonly called the hot-lead kettle, the wire passes into a quenching vessel 16 filled with oil 18. This vessel is also provided with a temperature controlling jacket 20. The application of coolant is controlled by a thermostat 24. The second vessel is commonly called an oil pan and may be constructed of any material compatible with the oil at the temperature involved. Steel is normally used.

The wire next passes into the third vessel 26, filled with molten lead 28. This tempering vessel is also provided with a temperature controlled jacket 30 supplied with electrical energy through a thermostat 34. This last vessel is commonly called the cold-lead kettle and is usually constructed of cast-steel. After leaving vessel 26, the wire is coiled up on a conventional take-up winding device 36.

In the process of this invention, the first vessel 6 may be held at conventional hardening temperatures. That is, it should be above the first critical temperature ($A_c1$) of the steel wire or strip being treated. Typically, the first critical temperature is approximately 1350° F.; so that hardening temperatures somewhat above 1350° F. may be employed. The product should be within the first vessel sufficiently long to permit complete transformation to austenite.

In a conventional wire hardening process, the oil quench in the vessel 16 is for the purpose of substantially completely transforming the austenite to martensite. However, according to the present invention, the product is cooled at or near the critical rate, thus keeping to the left of the S-curve and minimizing the transformation of austenite prior to quenching, and the time-temperature relation of the oil quench is selected to provide from 10–55% retained austenite at the completion of the quench. In other words, the austenite is not completely or even substantially completely, transformed to martensite in the oil quench.

After the oil quench, the wire is immediately tempered in the vessel 26. If high tensile strength wire is being produced, prior processes normally utilize tempering temperatures of at least 800° F. However, according to this invention, the cold lead temperature, while depending on wire size, should be below 770° F. with wire speed also depending on wire size being upwards of 300 ft./min. for fine sizes, with decreasing speeds for coarser sizes. It is believed that higher tempering temperatures and/or long tempering times result in an undesirably large transformation of the retained austenite to bainite.

After the wire has been tempered, it is coiled on the reel 36 where it is air quenched. As the wire coils, a substantial percentage of the retained austenite transforms to martensite. Inasmuch as this transformation takes place after the tempering step, the martensite formed will be untempered. It is this untempered martensite, and the retained austenite, held in the matrix of tempered martensite which has been designated the aforementioned "white constituent." As will be more fully described hereinafter, the retained austenite and the untempered martensite have a similar appearance when the material is examined under 2000 times magnification after being Picral etched. In other words, it is difficult to distinguish the retained austenite in the sub-matrix of untempered martensite. For this reason, the two constituents have and will be referred to as the white constituent as they have a white or near white coloration after Picral etching. Thus, in analyzing or identifying a product of this invention, the percentage of white constituent is determined and then the amount of retained austenite is determined by X-ray diffraction. The remaining percentage of the white constituent is the untempered martensite. It should be noted that X-ray diffraction techniques will not distinguish between the tempered and the untempered martensite.

Figure 2:
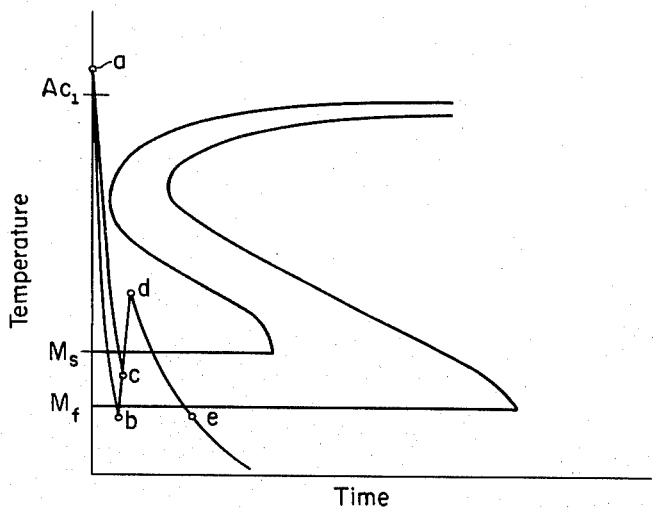
FIG. 2 is a transformation diagram curve for an iron-carbon system illustrating the process of this invention.

With reference to FIG. 2, the process of this invention is exemplified in terms of the S-curve or transformation diagram of an iron-carbon system utilized in a specific example of the process of this invention. The wire is hardened in the austenitic range above the $A_c1$ temperature; the wire is then quenched at the critical cooling rate to below the $M_s$ point for a time sufficient only to partially transform the austenite to martensite at band C, then the wire is reheated to a tempering temperature at $d$ to temper the martensite formed at band C during the oil quench. The wire is then air quenched along $d$–$e$ during which time the untransformed austenite is partially transformed to untempered martensite. It is, of course, understood that the process is a continuous one with regard to hardening, oil quench, tempering and air quench. The process is not particularly adapted to batch processing as the time intervals in the oil quench and temper baths as well as the time intervals between the hardening, oil quench and tempering must be of quite short duration, measured in seconds or fractions of seconds, in order for the desired result to be achieved in the product in a uniform manner through the product. However, if it is desired only to provide that the white constituent be present in the inner portion of the product, then the process might be conducted on a batch basis rather than a continuous one. Also, from the above it will be apparent that if it is desired to achieve a uniform dispersion of white constituent throughout the product, it is necessary to limit the size of the product treated to that which will assure that the product will uniformly reach the hardening, quenching and tempering temperatures in the times dictated by the lineal speed of the product while at the same time the desired transformation pattern will be obtained. Thus, it can be seen that, for example, with large diameter products, say one inch, it is not possible to achieve a uniform dispersion of the white constituent although it would be possible to obtain the white constituent in the inner portion of the wire, if desired.

The above description indicates generally the process and product of this invention. There will now be described, by way of illustration, specific examples of the novel process and products of this invention. Apparatus generally the same as that shown in FIG. 1 was utilized. The wire immersion area of the hardening tank was approximately three feet long. The wire immersion area of the quick quench tank was 2⅔ feet long. The wire travelled approximately 10 inches in air between the hardening and quench tanks. The cold lead tempering tank had a wire immersion area approximately 3⅓ feet long. The wire travelled in air approximately 3.4 feet between the quench and tempering tanks. Round steel wire of .0118 inch diameter and with .75% carbon and .96% manganese was processed. The hot-lead hardening bath was held at 1425° F., and the wire was advanced at the rate of 250 feet per minute. Accordingly, each cross sectional portion of the wire was in the hardening tank approximately 0.72 second, was in the quench tank for approximately 0.64 second, then passed through air for approximately 0.82 second, and was in the tempering tank for approximately 0.80 second. In the following Table I there is set forth the characteristics of the wire processed under these conditions with varying temperatures for the cold-lead tempering bath.

TABLE I

| Tempering temperature, °F | 570 | 680 | 710 | 740 | 770 | 800 |
|---|---|---|---|---|---|---|
| Tensile strength in 1,000 lbs./sq. in | 425 | 380 | 355 | 326 | 320 | 305 |
| Yield strength in 1,000 lbs./sq. in | 180 | 168 | 192 | 224 | 247 | 272 |
| Yield as percentage of tensile | 42.3 | 44.1 | 54.3 | 68.5 | 77.2 | 89.0 |
| Percent elongation | 5.0 | 6.2 | 6.0 | 4.3 | 3.65 | 2.85 |
| Knoop Hardness No | 775 | 703 | 667 | 650 | 641 | 625 |
| Fatigue in minutes to failure | 8.8 | 11.9 | 7.3 | 3.6 | 3.4 | 2.5 |
| Percent white constituent | 54.0 | 52.7 | 33.2 | 18.2 | 11.7 | 2.2 |
| Percent retained austenite | | 8.6 | 4.7 | | 2.6 | |
| Percent untempered martensite | | 44.1 | 28.5 | | 9.1 | |

The values shown in Table I were obtained as follows: The ultimate tensile strength and percent elongation at breaking load were obtained directly on a 12,000 pound capacity Tinius Olsen Electro-O-Matic Tensile Testing Machine, Serial 59359-7, manufactured by Tinius Olsen Testing Machine Company, Willow Grove, Pennsylvania. This machine charts electronically the elongation in a 10 inch gauge length sample versus the applied load in pounds. The standard 0.2% offset method is used to determine yield strength. That is, yield strength was determined as the value of applied load at which elongation increased by 0.2% over that which would result if the elongation continued its initial relationship to applied load. The hardness tests were made on a Kentron Microhardness Tester, manufactured by Kent Cliff Laboratories, Division of the Torsion Balance Company, Clifton, New Jersey. A 100-gram load and a Knoop indenter were used, and standard Knoop hardness numbers were obtained. The fatigue tests were made on a Hunter Rotating Beam Fatigue Tester, model 802, manufactured by Hunter Spring Company of Lonsdale, Pennsylvania. The machine was adjusted to give a calculated tensile stress of 230,000 p.s.i. The wire was stressed alternately in tension and compression 3,600 times per minute with minutes to failure being indicated in the Table I.

The percent of the white constituent in the resulting product was determined by a linear count technique. A photomicrograph, at 2000 times magnification, of the product was used. The area photographed was selected to provide an area wherein the white constituent was uniformly distributed. In this connection and as has been noted above, at the very surface of the wire, there may be a skin area in which there is little or no white constituent. When determining the percentage of white constituent this area should be disregarded. This is particularly true where the product has been processed so that there is a substantial shell area or skin which is free or substantially free of untempered martensite.

The photomicrographs were approximately 3²⁹⁄₃₂ inches long and 2²⁸⁄₃₂ inches wide. Each photomicrograph was divided by parallel lines running longitudinally of the photograph and spaced an eighth inch apart. Each photograph was further divided by parallel, one-eighth inch spaced lines running laterally of the photograph. An area of 18 lines in the long direction and 24 lines in the width direction was utilized in the count. Using a transparent plastic scale divided into ¹⁄₃₂ inch segments, the count was determined by laying the scale along each ⅛ inch spaced line and counting the number of ¹⁄₃₂ inch markings on the scale which intersected white constituent. In this manner 2196 counts were possible in the longitudinally extending ⅛ inch spaced lines and 2208 counts were possible in the laterally extending ⅛ inch spaced lines. The total ¹⁄₃₂ inch markings in the longitudinally and laterally spaced lines are sufficiently identical that a substantially equally weighted average may be taken of the white constituent count in the longitudinally and laterally extending lines. The percentage obtained by a count on the longitudinal lines was compared to that obtained on the lateral lines and to the average of the count on the longitudinal and lateral lines. The error was about ±2.7% when comparing the average count with the count in either direction and 10% or more of the white constituent present in the microstructure. In the tables herein and the appended claims, the percentage white constituent specified is determined by averaging the count using the longitudinally and laterally extending lines.

The percentage of retained austenite specified in the tables hereof and in the appended claims was and is to be determined by X-ray diffraction. Metallurgical mounting were made of each sample to be subjected to X-ray diffraction by cutting twenty ¼ inch lengths of the given wire sample and setting these side by side as closely as possible in a Bakelite mount. These were rough polished down to where very near the full diameter of all twenty wires was exposed. The mounting was then given a metallurgical polish, with etch and polish repeated twice to be sure that any metal distortion from previous metal removal by coarse abrasives had been eliminated. The sample was then subjected to X-ray diffraction for determining retained austenite. These determinations were made by the Alloyed Corporation of 35 Cambridge Parkway, Cambridge 42, Massachusetts. The general principles applied in the use of the X-ray diffraction apparatus are described in an article appearing in "Transactions of the American Society of Metals" volume 42, 1950, page 112 entitled "Measurement of Retained Austenite in Carbon Steel" by B. L. Averbach, L. F. Castleman and M. Cohen; and the same with some modifications in an article by B. L. Averbach entitled "Retained Austenite by X-ray Method" appearing in "American Institute of Mining and Metallurgical Engineers' Journal of Metals" volume V, 1953, page 87.

Essentially, the equipment used consists of an X-ray tube source mounted to shoot a beam to a specimen mounting set at the center of a goniometer on whose periphery is mounted a Geiger counter to collect impulses of diffracted radiation. In this instance, chrome-K radiation was used. The X-ray beam had a diameter of approximately 1/16 inch. Means for centering this beam on the desired spot on the specimen is provided through a telescopic lens, mounted on the instrument. From practiced technique and previous instrument calibration, the Geiger counter is set at the proper angle and the spectrometer slit set at the proper opening. During a standard time period, impulses collected in the Geiger counter are counted electronically, and from this information is derived the determination of percentage of retained austenite.

The retained austenite determination, as made by the above described procedure, reflects the percentage retained austenite as an average over the entire exposed cross section of the wires. As noted above, there is a rim area at the surface of the wire which contains no white constituent, and therefore, no retained austenite. Since the above described measurement of white constituent is in the area where the white constituent appears throughout the measured section, the value of percentage of retained austenite in that area should only be considered for comparison purposes. Since X-ray penetration into the surface is only a superficial (possibly .0001") the diffracted radiation from retained austenite is proportional to surface area, and since the only dimension affected by differences in white constituent is the width of samples, the resulting effect is linear. Therefore, by measuring the width of a sample, as irradiated, and measuring the width of the two bands at the surface of the sample, the percent of retained austenite in the area containing white constituent would be the measured percentage in the total sample increased by the ratio of total width of the specimen, divided by total width, minus the width of the band on each side containing no white constituent. The percentage retained austenite set out in the tables herein was arrived at in this manner. The percentage of untempered martensite specified in the tables hereof and in the appended claims was and is to be determined by subtracting from the percentage white constituent, the percentage retained austenite with these values being determined as set out above.

FIG. 3 is a chart plotting two characteristics from Table I against tempering temperature, yield strength as a percent of ultimate strength, and percent white constituent are plotted. From an inspection of Table I, it is apparent that ultimate strength increased as the tempering temperature is lowered. Furthermore, the yield strength decreases as tensile strength increases so that in the chart of FIG. 3 it is clear that the ratio of yield strength to ultimate strength is substantially reduced as the tempering temperature is lowered. As can be seen, very good correlation exists between the reduction in ratio of yield strength to ultimate strength and the percent of white constituent.

FIGS. 4, 5 and 6 are photomicrographs originally at 1000 times magnification of samples of the products of Table I corresponding to tempering temperatures of 680° F., 740° F. and 800° F., respectively. These samples were prepared by a standard Picral etch. The appearance of three microstructures reflects the difference in white constituent tabulated in Table I, that is approximately 53% for FIG. 4, 18% for FIG. 5 and 2% for FIG. 6. While not distinguishable in the photomicrographs, a whiter, less etched component exists within the white constituent. This component is the retained austenite while the surrounding portion of the white constituent is the sub-matrix of untempered martensite. With the decrease in white constituent with increases in the tempering temperature some of the retained austenite is transformed into bainite.

The following Table II sets forth characteristics obtained with the same steel wire and process equipment described above in connection with Table I. In this case, however, the hardening temperature was held as 1425° F., the tempering temperature was held at 680° F., and the wide speed was varied as noted.

TABLE II

| Wire speed, ft./min | 100 | 150 | 200 | 250 | 300 | 350 |
|---|---|---|---|---|---|---|
| Tensile strength in 1,000 lbs./sq. in | 362 | 364 | 362 | 385 | 390 | 410 |
| Yield strength in 1,000 lbs./sq. in | 265 | 230 | 191 | 172 | 162 | 174 |
| Yield as percentage of tensile | 73.2 | 63 | 53 | 44.8 | 41.6 | 42.5 |
| Percent elongation | 4.1 | 5.2 | 5.5 | 6.5 | 6.4 | 6.4 |
| Knoop Hardness No | 697 | 703 | 721 | 684 | 723 | 733 |
| Fatigue in minutes to failure | 5.5 | 5.4 | 7.9 | 13.9 | 10.0 | 9.6 |
| Percent white constituent | 11.3 | 22.8 | 37.5 | 51.8 | 51.5 | 53.6 |
| Percent retained austenite | 3.4 | | 9.7 | | 10.2 | |
| Percent untempered martensite | 7.9 | | 27.8 | | 41.3 | |

FIG. 7 is a chart plotting two characteristics from Table II against wire speed. Yield strength as a percent of ultimate strength and percent white constituent are plotted. Again Table II shows ultimate tensile strength increases as the ratio of yield strength to ultimate strength decreased with increases in white constituent. FIG. 7 shows that as the wire speed increases, the percentage of white constituent increases and ratio of yield strength to ultimate strength decreases. As can be seen from a comparison of FIGS. 3 and 7, very good correlation exists between percent white constituent and the ratio of yield to ultimate strength. FIGS. 8, 9 and 10 are photomicrographs, originally at 1000 times magnification, of the products of Table II corresponding to wire speeds of 100, 200 and 300 feet per minute respectively. Again the appearance of the three photographs reflects the difference in white constituent approximately 11% for FIG. 8, 38% for FIG. 9 and 51% for FIG. 10.

It will be noted that although the hardening and tempering temperatures used in the examples of Table II were ones which in the case of the examples of Table I were found to produce a high percentage of white constituent, under the conditions of Table II, there is a substantial variation in the percentage of white constituent. This variation results from the fact that at the slower speeds more austenite is transformed to martensite in the oil quench and prior to tempering. Also, a greater amount of retained austenite is transformed to bainite in the tempering step. However, even at the slowest speed of 100 feet per minute with the tempering temperature used, i.e. 680° F., substantial untransformed martensite remains in the end product.

The following Table III sets forth characteristics obtained with the same steel wire and process equipment described above in connection with Table I but with the tempering temperature held at 680° F., the wire speed held at 250 feet per minute, and the hardening temperature varied.

TABLE III

| Hardening temperature, °F | 1,380 | 1,400 | 1,425 | 1,450 | 1,500 | 1,550 |
|---|---|---|---|---|---|---|
| Tensile strength in 1,000 lbs./sq. in | 383 | 373 | 388 | 377 | 369 | 376 |
| Yield strength in 1,000 lbs./sq. in | 179 | 172 | 182 | 176 | 172 | 182 |
| Yield as percentage of tensile | 47 | 46 | 47 | 46.5 | 46.5 | 48.5 |
| Percent elongation | 6.9 | 5.9 | 6.7 | 6.45 | 6.3 | 6.0 |
| Knoop Hardness No | 690 | 703 | 684 | 688 | 695 | 695 |
| Fatigue in minutes to failure | 6.4 | 7.8 | 13.9 | 8.4 | 11.5 | 8.2 |
| Percent white constituent | 40.0 | 47.1 | 50.7 | 51.1 | 51.7 | 45.2 |
| Percent retained austenite | 7.1 | | | 6.8 | | 8.5 |
| Percent untempered martensite | 32.9 | | | 44.3 | | 36.7 |

Figure 11:
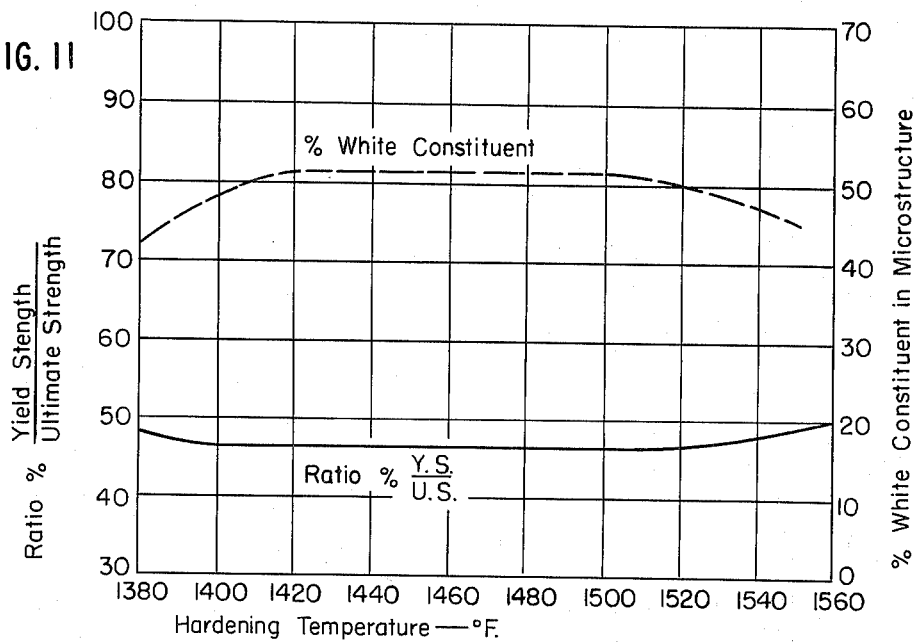
FIG. 11 is a chart showing plots of the ratio of yield strength to ultimate strength, and percent of white constituent all as a function of hardening temperature of wire product processed in accordance with this invention.

FIG. 11 is a chart plotting two characteristics obtained with the examples of Table III against hardening temperature. Yield strength as a percent of ultimate tensile strength and percent white constituent are plotted. Relatively high proportions of white constituent were obtained with all products of this table. Accordingly, high ultimate tensile strength and relatively low yield to ultimate strength ratios are obtained for all items. The small variations which do exist consist of a slight lowering of ultimate strength, and corresponding rise in yield to ultimate strength ratios, at the two extremes of hardening temperature.

Figure 12:
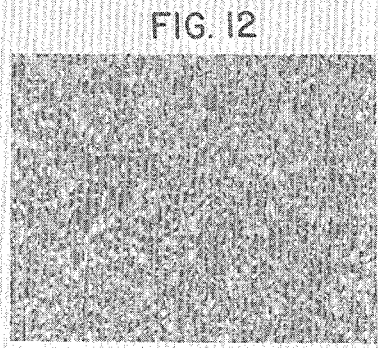
FIG. 12 is a photomicrograph of a product of this invention produced with a hardening temperature of 1425° F.
Figure 13:
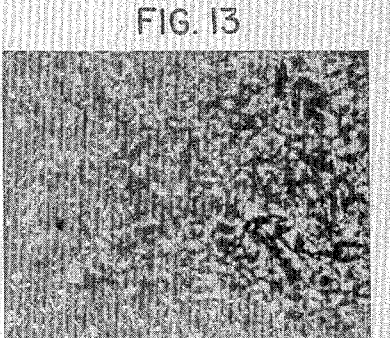
FIG. 13 is a photomicrograph of a product of this invention produced with a hardening temperature of 1450° F.
Figure 14:
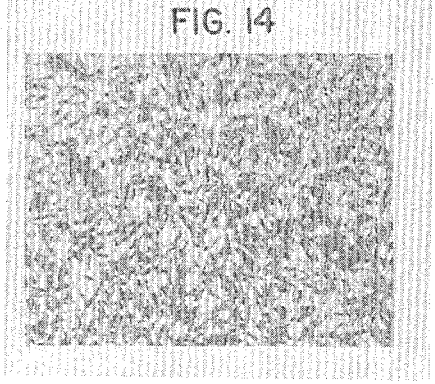
FIG. 14 is a photomicrograph of a product of this invention produced at a hardening temperature of 1550° F.

FIGS. 12, 13 and 14 are photomicrographs originally at 1000 times magnification of samples of products of Table III corresponding to hardening temperatures of 1425° F., 1450° F. and 1550° F. respectively. These microstructures show the characteristic which has found to vary substantially with hardening temperature, namely the grain size, which was relatively fine at 1425° F. hardening temperature, had increased substantially at 1450° F. and was even more pronounced at 1550° F. In selecting the hardening temperature to be used, various factors should be considered. The temperature should be sufficiently high to obtain complete austenitizing of the wire before it enters the quick quench. In practice, then, the microstructure should be free of ferrites after hardening at the wire speed utilized. Also, it is desirable to have a relatively finely divided and uniformly distributed white constituent. Based on these considerations, a hardening temperature of between 1400° F. and 1450° F.; viz. 1425° F., was chosen for the examples of Tables I and II.

It has also been found that variations in the chemical composition of material treated in accordance with this invention will effect the results achieved. For example, it has been found that when the manganese content is held substantially constant in the range of .80–1.00%, and the carbon content is varied, the higher the carbon, the higher will be the ultimate tensile and elongation, and the lower will be the yield strength and ratio of yield to ultimate strength. It has further been found that with the carbon held substantially constant in the .75–.85% range, and the manganese is decreased down to approximately .40%, the ultimate tensile shows little change, but the yield strength is much lower with the higher manganese content and the elongation higher. It is believed then that a higher carbon content tends to increase ultimate tensile and elongation and to decrease yield strength and ratio of yield to ultimate strength, while a high manganese content tends to have a similar effect but to a lesser extent as regards ultimate tensile strength.

TABLE IV

| Tempering temperature, °F | 680 | 720 | 760 | 800 | 840 |
|---|---|---|---|---|---|
| Tensile strength in 1,000 lbs./sq. in. | 365 | 344 | 334 | 332 | 322 |
| Yield strength in 1,000 lbs./sq. in. | 224 | 223 | 253 | 286 | 281 |
| Yield as percentage of tensile | 61.3 | 64.9 | 75.9 | 86.3 | 87.3 |
| Percent elongation | 6.4 | 5.3 | 5.3 | 3.9 | 4.5 |
| Knoop Hardness No | 720 | 705 | 695 | 690 | 684 |
| Fatigue to minutes to failure | 3.1 | 4.3 | 4.2 | 3.0 | 3.1 |
| Percent white constituent | 32.9 | 22.4 | 15.7 | 11.6 | 10.2 |
| Percent retained austenite | 3.4 | | 2.5 | | 3.0 |
| Percent untempered martensite | 29.5 | | 13.2 | | 7.2 |

TABLE V

| Wire speed, feet per minute | 150 | 200 | 250 | 300 | 350 | 400 | 450 |
|---|---|---|---|---|---|---|---|
| Tensile strength in 1,000 lbs./sq. in | 346 | 350 | 343 | 349 | 348 | 347 | 357 |
| Yield strength in 1,000 lbs./sq. in. | 303 | 296 | 252 | 232 | 219 | 215 | 222 |
| Yield as percentage of tensile | 87.7 | 84.6 | 73.4 | 66.6 | 62.9 | 62.0 | 62.0 |
| Percent elongation | 3.4 | 4.2 | 4.3 | 5.6 | 5.3 | 4.9 | 5.5 |
| Knoop Hardness No | 729 | 729 | 749 | 759 | 759 | 759 | 769 |
| Fatigue in minutes to failure | 2.7 | 3.5 | 2.9 | 3.8 | 3.0 | 3.7 | 4.4 |
| Percent white constituent | 8.0 | 12.7 | 16.7 | 20.7 | 30.2 | 29.8 | 31.0 |
| Percent retained austenite | 2.5 | | 3.5 | | 2.6 | | |
| Percent untempered martensite | 5.5 | | 13.2 | | 27.6 | | |

TABLE VI

| Hardening temperature, °F | 1,500 | 1,550 | 1,600 |
|---|---|---|---|
| Tensile strength in 1,000 lbs./per sq. in | 355 | 360 | 363 |
| Yield strength in 1,000 lbs./per sq. in. | 230 | 223 | 220 |
| Yield as percentage of tensile | 64.9 | 62 | 60.6 |
| Percent elongation in 10″ | 6.2 | 5.9 | 5.9 |
| Knoop Hardness No | 709 | 723 | 742 |
| Fatigue in minutes | 5.3 | 5.3 | 4.5 |
| Percent white constituent | 23.2 | 32.9 | 34.7 |

TABLE VII

| Tempering temperature, °F | 680 | 720 | 760 | 800 | 840 |
|---|---|---|---|---|---|
| Tensile strength in 1,000 lbs./sq. in | 326 | 320 | 303 | 289 | 289 |
| Yield strength in 1,000 lbs./sq. in. | 206 | 252 | 245 | 239 | 269 |
| Yield as percentage of tensile | 63.7 | 78.9 | 81 | 82.6 | 93.2 |
| Percent elongation in 10″ | 5.6 | 5.2 | 4.5 | 3.7 | 2.8 |
| Knoop Hardness No | 700 | 690 | 680 | 660 | 640 |
| Fatigue in minutes to failure | 3.5 | 2.3 | 1.9 | 1.4 | 1.5 |
| Percent white constituent | 21.6 | 11.6 | 8.9 | 7.7 | 2.9 |
| Percent retained austenite | 3.7 | | 2.8 | | 2.4 |
| Percent untempered martensite | 18.0 | | 6.2 | | 0.6 |

TABLE VIII

| Wire speed in feet per minute | 150 | 200 | 250 | 300 | 350 | 400 | 450 |
|---|---|---|---|---|---|---|---|
| Tensile strength in 1,000 lbs./sq. in | 319 | 326 | 326 | 325 | 329 | 343 | 336 |
| Yield strength in 1,000 lbs./sq. in | 287 | 287 | 267 | 231 | 230 | 219 | 202 |
| Yield as percentage of tensile | 90 | 88 | 82 | 71 | 70 | 64 | 63 |
| Percent elongation (10″) | 4.1 | 4.7 | 5.1 | 5.3 | 5.8 | 5.9 | 6.8 |
| Knoop Hardness No | 664 | 670 | 678 | 684 | 690 | 706 | 706 |
| Fatigue in minutes to failure | 2.7 | 3.1 | 3.0 | 2.8 | 3.4 | 3.4 | 3.5 |
| Percent white constituent | 5.8 | 6.8 | 10.7 | 16.1 | 17.2 | 21.2 | 22.3 |
| Percent retained austenite | | 3.7 | | 3.9 | | 3.7 | |
| Percent untempered martensite | | 3.2 | | 12.3 | | 17.6 | |

TABLE IX

| Hardening temperature, °F | 1,500 | 1,550 | 1,600 |
|---|---|---|---|
| Tensile strength in 1,000 lbs./sq. in | 320 | 326 | 335 |
| Yield strength in 1,000 lbs./sq. in | 213 | 206 | 201 |
| Yield as percentage of tensile | 66.5 | 63.7 | 60.1 |
| Percent elongation in 10″ | 5.0 | 5.6 | 6.1 |
| Knoop Hardness No | 697 | 700 | 700 |
| Fatigue in minutes | 3.3 | 3.5 | 3.3 |
| Percent white constituent | 20 | 21.6 | 23.1 |

Figure 15:
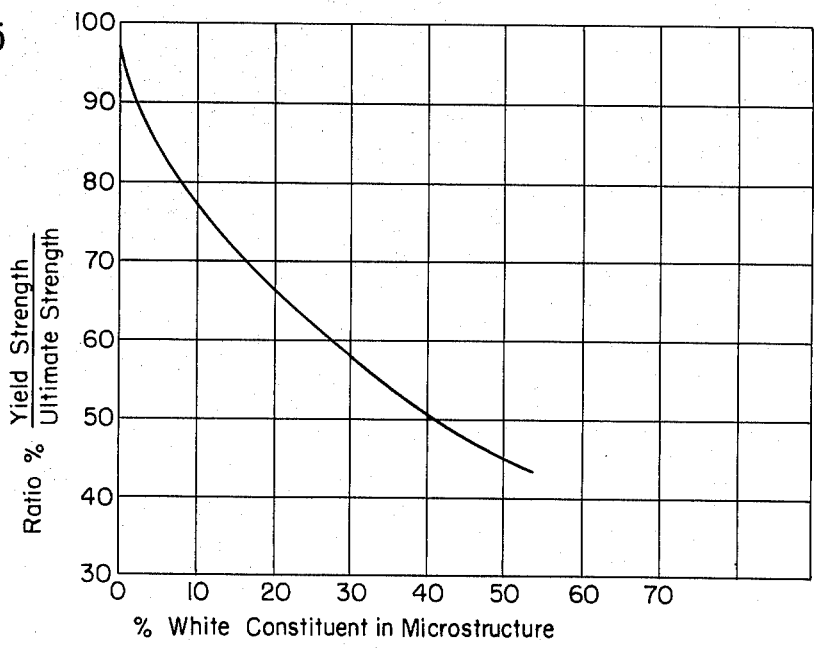
FIG. 15 is a curve showing ratio of yield to ultimate strength as a function of the white constituent of a product produced by the process of this invention.

In FIG. 15, the ratio of yield to ultimate strength for the examples of Tables I through IX is plotted against percent white constituent. It will be noted that although these examples were produced under the varying conditions outlined above, there is a very good correspondence between percent white constituent and the ratio of yield to ultimate strength. Thus, it is believed clear that regardless of processing conditions, the percent white constituent is the major factor in determining the ratio of yield to ultimate strength and of controlling the yield strength of the steel.

While it might be thought that the increased tensile strength and decreased yield to ultimate strength ratios would be obtained at the expense of other characteristics, an examination of the preceding tables shows that other characteristics have been maintained or improved. In particular, increased hardness and resistance to fatigue accompany increases in the percentage of white constituent. Similarly, products with higher percentages of white constituent have increased elongation as compared to the usual tempered steel of like analysis. Thus, products according to this invention possess the novel combination of high ductility, high ultimate tensile strength, increased hardness, high fatigue resistance, and increased elongation.

It should be noted that all of the above characteristics and values were determined at least 18 to 24 hours after heat treatment of the wire. Other than this customary delay before test and analysis, no extended or special "aging" of the wire was required to achieve the advantageous results.

For some applications it may be desirable to return the wire to higher ratios of yield to ultimate strength subsequent to the heat treating process of this invention. In such cases, a subsequent conventional tempering process may be employed. The yield strength of the metal will, as a result of this additional tempering, rise to a value approaching what would normally be expected for the particular analysis steel. Thus, it can be seen that by the novel process of this invention, there can be provided a wire or strip with lower carbon content and lower processing cost, which will as compared to conventional oil tempered wire or strip of higher carbon content, have a higher ultimate strength, greatly reduced yield to ultimate strength ratio, high elongation, and in other words, superior properties of strength and toughness, including higher fatigue resistance. Wire processed in accordance with this invention has been found to provide excellent results when used to provide springs, even though the ultimate strength of the wire was as high as 400,000 p.s.i. As noted above, these superior results achieved with steel process in accordance with this invention is believed due to the presence of the white constituent. Also, as noted above, the properties of the steel vary with the percentage white constituent. While even a minor amount of this white constituent, as defined above, is advantageous, it is preferred to provide at least approximately 10% of this constituent. As can be seen from the preceding Tables I and II and the curves of FIGS. 3, 7 and 15, at approximately 10% white constituent, the yield to ultimate ratio is between 75–80%. Thus, it is when the percentage white constituent is at least approximately 10% that the most advantageous results of the invention begin to be achieved. Also, as can be seen from the aforementioned tables and curves, it appears that the maximum advantageous percentage of white constituent is approximately 55%, at which point the yield to ultimate ratio is approximately 40%.

With the low alloy steels it is not practical to achieve percentages of white constituent quite as high as the maximum possible with plain carbon steels. However, it is still true that the most advantageous results of the invention begin to be achieved when the percentage white constituent is at least approximately 10% of the total microstructure. As noted above, the curves plotted in FIGURE 40 illustrate the dependence of yield to ultimate strength ratios upon the percent white constituent for all examples, those employing plain carbon steel and those employing low alloy steels.

As described above, various steps in the novel process of this invention may be varied to achieve the desired yield strength of the steel; for example, tempering temperature, speed of advance of the wire, chemical composition of the wire. Also, of course, the length of the various tanks and the spacing thereof could be varied to achieve similar results inasmuch as the process is dependent on a time temperature relation. Thus, it will be clear that while the process has been described in the light of certain specific examples, it will be understood that many variations of the process described are possible within the scope of this invention. Therefore, the foregoing description and accompanying drawings are to be taken only in an illustrative and not in a limiting sense.

The above description has used plain carbon steel examples. As indicated earlier, applicant has found that his process produces improved product characteristics with steels which upon a full quench to atmospheric temperature from the austenitic state contain less than approximately 10% retained austenite. It has been long recognized in the metallurgical arts that in general such steels are the plain carbon and low alloy steels. High alloy steels, such as typical tool steels, normally contain more than 10% retained austenite upon a full quench to room temperature from the austenitic state.

The processing considerations to produce alloy steel products according to the present invention are generally the same as those set forth above for the carbon steel examples. Particular processing conditions for two typical low alloy steels are described below. Analysis of the first alloy, chrome silicon steel, indicated it contained carbon 0.54%, manganese 0.70%, silicon 1.40%, and chromium 0.65%. This steel is within the standard established in the steel industry as SAE 9254. The steel was drawn to the same 0.0118 inch diameter to provide exact comparison with the above plain carbon examples.

The apparatus of FIGURE 1 was employed to process the chrome silicon steel examples. The hardening tank 6 was located 10 inches ahead of the quench tank 16 so that the wire travelled approximately 10 inches in air between the two tanks. The quench tank was approximately 2 ft. long. The wire travelled in air approximately 4 ft. between the quench tank and the tempering tank 26. The tempering tank had a wire immersion area approximately 3⅓ ft. long. Table IV below sets forth values obtained utilizing the apparatus of FIGURE 1 and a wire speed of 350 ft. per minute. The $A_{c1}$ temperature of the chrome silicon steel is approximately 1400° F. The hardening temperature was held at approximately 1550° F. to assure complete transformation to the austenitic state. The values set forth in Table IV, and the subsequent tables, were obtained by measurement techniques identical to those discussed in conection with Table I above.

TABLE IV

| Tempering temperature, ° F | 680 | 720 | 760 | 800 | 840 |
|---|---|---|---|---|---|
| Tensile strength in 1,000 lbs./sq. in. | 365 | 344 | 334 | 332 | 322 |
| Yield strength in 1,000 lbs./sq. in. | 224 | 223 | 253 | 286 | 281 |
| Yield as percentage of tensile | 61.3 | 64.9 | 75.9 | 86.3 | 87.3 |
| Percent elongation | 6.4 | 5.3 | 5.3 | 3.9 | 4.5 |
| Knoop Hardness No | 720 | 705 | 695 | 690 | 684 |
| Fatigue in minutes to failure | 3.1 | 4.3 | 4.2 | 3.0 | 3.1 |
| Percent white constituent | 32.9 | 22.4 | 15.7 | 11.6 | 10.2 |
| Percent retained austenite | 3.4 | | 2.5 | | 3.0 |
| Percent untempered martensite | 29.5 | | 13.2 | | 7.2 |

Figure 16:
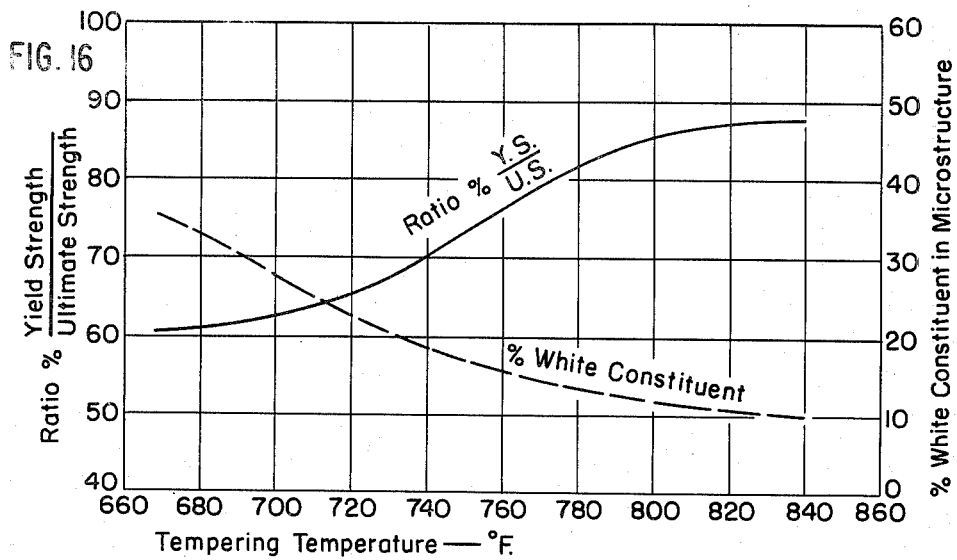
FIG. 16 is a chart showing plots of the ratio of yield strength to ultimate strength, and percent of white constituent as a function of tempering temperature of a chrome silicon wire product processed in accordance with this invention.

FIGURE 16 is a chart plotting two characteristics from Table IV against tempering temperature; yield strength as a percent of ultimate strength and percent white constituent are plotted. From an inspection of Table IV it is apparent that ultimate strength increased as the tempering temperature was lowered. Furthermore, the yield strength decreased as tensile strength increased so that in the chart of FIGURE 16 it is apparent that the ratio of yield strength to ultimate strength was substantially reduced as the tempering temperature was lowered. It is apparent from FIGURE 16 that good correlation exists between the reduction in the ratio of yield to ultimate strength and the percent of white constituent.

Although the chrome silicon steel used to obtain the data plotted in FIGURE 16 is more resistant to tempering than the plain carbon steels used to obtain the data plotted in FIGURE 3, around 680° F. is still an optimum tempering temperature. Likewise, it is also true that lower tempering temperatures than those taught by the prior art are advantageous with the chrome silicon steel.

Figure 17:
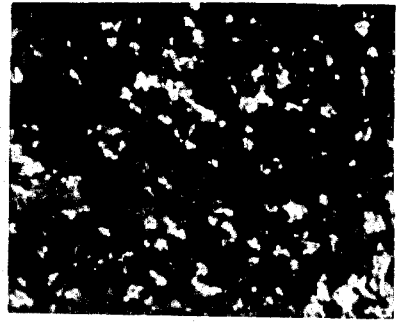
FIG. 17 is a photomicrograph of a chrome silicon product of the invention tempered at 680° F.
Figure 18:
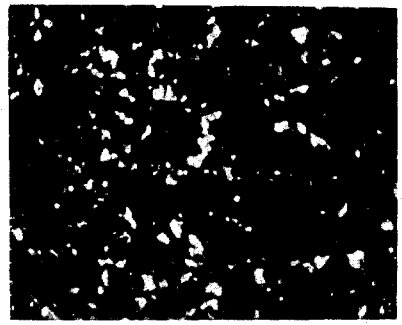
FIG. 18 is a photomicrograph of a chrome silicon product of this invention tempered at 760° F.
Figure 19:
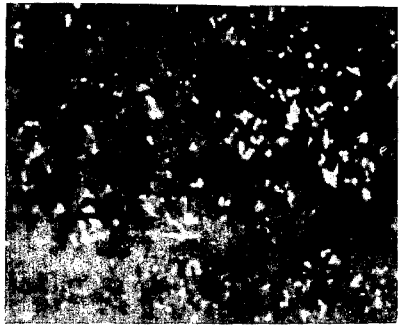
FIG. 19 is a photomicrograph of a chrome silicon product of this invention tempered at 840° F.

FIGURES 17, 18 and 19 are photomicrographs, originally at 3,300 times magnification, of samples of products of Table IV corresponding to tempering temperatures of 680° F., 760° F. and 840° F. respectively. All of the low alloy steel samples were prepared by a standard Nital etch. The appearance of the three microstructures reflects the difference in white constituent tabulated in Table IV, that is, approximately 33% for FIGURE 17; 16% for FIGURE 18 and 10% for FIGURE 19. While not distinguishable in the photomicrographs, a whiter, less etched component exists within the white constituent. This component is the retained austenite, while the surrounding portion of the white constituent is the sub-matrix of untempered martensite. With the decrease in white constituent with increases in the tempering temperature, some of the retained austenite is transformed into bainite.

Figure 20:
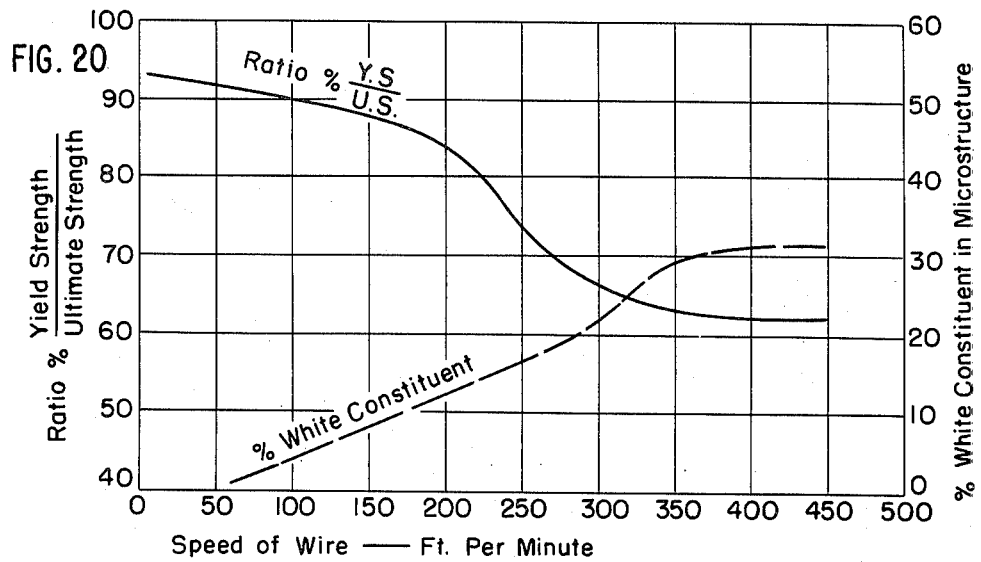
FIG. 20 is a chart showing plots of the ratio of yield strength to ultimate strength and percent of white constituent as a function of wire speed of a chrome silicon wire processed in accordance with this invention.

The following Table V sets forth characteristics obtained with the same chrome silicon steel wire and apparatus described above in connection with Table IV. In this case, however, the hardening temperature was held at 1550° F. and the tempering temperature was held constant at 680° F. The wire speed was varied as noted in the table. FIGURE 20 is a chart plotting two characteristics from Table V against wire speed. Yield strength as a percent of ultimate strength and percent white constituent are plotted. Again Table V shows ultimate tensile strength increased and the ratio of yield to ultimate strength decreased with increases in white constituent. FIGURE 20 shows that as the wire speed increases the percentage of white constituent increases and the ratio of yield strength to ultimate strength decreases.

TABLE V

| Wire speed, feet per minute | 150 | 200 | 250 | 300 | 350 | 400 | 450 |
|---|---|---|---|---|---|---|---|
| Tensile strength in 1,000 lbs./sq. in | 346 | 350 | 343 | 349 | 348 | 347 | 357 |
| Yield strength in 1,000 lbs./sq. in. | 303 | 296 | 252 | 232 | 219 | 215 | 222 |
| Yield as percentage of tensile | 87.7 | 84.6 | 73.4 | 66.6 | 62.9 | 62.0 | 62.0 |
| Percent elongation | 3.4 | 4.2 | 4.3 | 5.6 | 5.3 | 4.9 | 5.5 |
| Knoop Hardness No | 729 | 729 | 749 | 759 | 759 | 759 | 769 |
| Fatigue in minutes to failure | 2.7 | 3.5 | 2.9 | 3.8 | 3.0 | 3.7 | 4.4 |
| Percent white constituent | 8.0 | 12.7 | 16.7 | 20.7 | 30.2 | 29.8 | 31.0 |
| Percent retained austenite | 2.5 | ----- | 3.5 | ----- | 2.6 | ----- | ----- |
| Percent untempered martensite | 5.5 | ----- | 13.2 | ----- | 27.6 | ----- | ----- |

Figure 21:
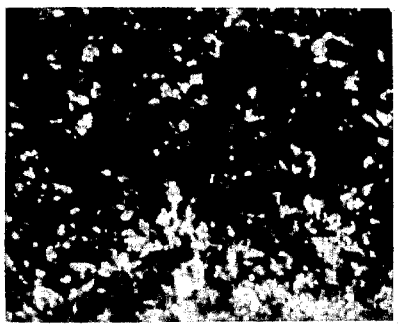
FIG. 21 is a photomicrograph of a chrome silicon product of this invention processed at a wire speed of 150 feet per minute.
Figure 22:
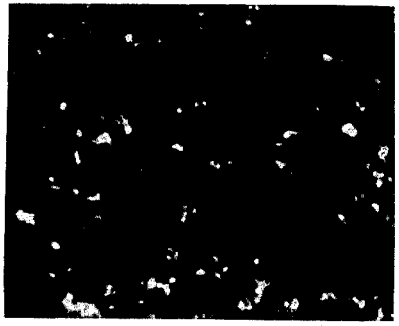
FIG. 22 is a photomicrograph of a chrome silicon product of this invention produced at a wire speed of 250 feet per minute.
Figure 23:
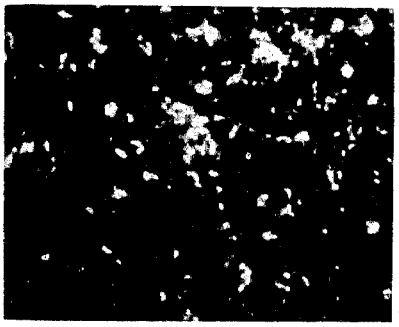
FIG. 23 is a photomicrograph of a chrome silicon product of this invention produced at a wire speed of 350 feet per minute.

As can be seen from a comparison of FIGURES 16 and 20, very good correlation exists between the percent white constituent and the ratio of yield to ultimate strength. FIGURES 21 through 23 are photomicrographs, originally at 3,300 times magnification, of the products of Table V corresponding to wire speeds of 150, 250 and 350 ft. per minute respectively. Again the appearance of the three photographs reflects the difference in white constituent. The percentage is approximately 13% for FIGURE 21; 21% for FIGURE 22 and 30% for FIGURE 23.

The hardening and tempering temperatures used in the examples of Table V were ones which in the case of the examples of Table IV were found to produce a high percentage of white constituent. Nevertheless, as with the plain carbon steel examples, there was a substantial variation in the percentage of white constituent. This variation is believed to result from the fact that at the slowest speeds more austenite is transformed to martensite in the oil quench and prior to tempering. Also, a greater amount of retained austenite is transformed to bainite in the tempering step. At 200 feet per minute, with the 680° F. tempering temperature, substantial untransformed martensite remains in the end product. At the slowest speed of 150 feet per minute the percent white constituent has dropped just below 10% and the characteristics of the steel begin to approximate that processed by conventional techniques.

The following Table VI sets forth characteristics obtained with the same chrome silicon steel wire and processing apparatus described above in connection with Table IV, but with the tempering temperature held at 680° F. and the wire speed held at 350 feet per minute. The hardening temperature was varied from 1500 to 1600 degrees.

TABLE VI

| Hardening temperature, ° F | 1,500 | 1,550 | 1,600 |
|---|---|---|---|
| Tensile strength in 1,000 lbs./per sq. in | 355 | 360 | 363 |
| Yield strength in 1,000 lbs./per sq. in. | 230 | 223 | 220 |
| Yield as percentage of tensile | 64.9 | 62 | 60.6 |
| Percent elongation in 10" | 6.2 | 5.9 | 5.9 |
| Knoop Hardness No | 709 | 723 | 742 |
| Fatigue in minutes | 5.3 | 5.3 | 4.5 |
| Percent white constituent | 23.2 | 32.9 | 34.7 |

Figure 24:
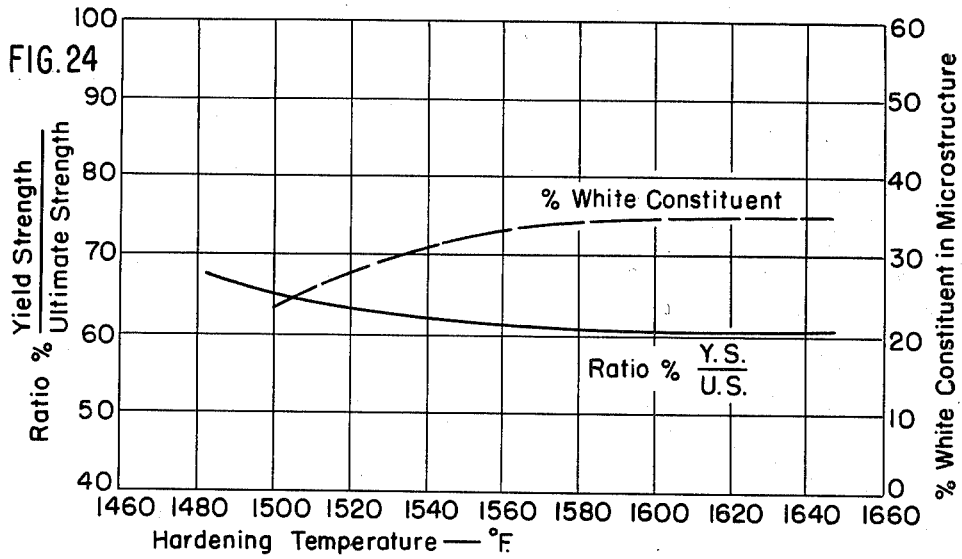
FIG. 24 is a chart showing plots of the ratio of yield strength to ultimate strength and percent of white constituent, all as a function of hardening temperature of a chrome silicon wire product processed in accordance with this invention.

FIGURE 24 is a chart plotting two characteristics obtained with the examples of Table VI against hardening temperature. Yield strength as a percent of ultimate tensile strength and percent white constituent are plotted. Relatively high proportions of white constituent were obtained with all products of this table. Accordingly, high ultimate tensile strength and relatively low yield to ultimate strength ratios were obtained for all items. The small variation which does exist consists of a slight increase in ultimate tensile strength and a corresponding decrease in yield to ultimate strength ratios as the hardening temperature increases.

Figure 25:
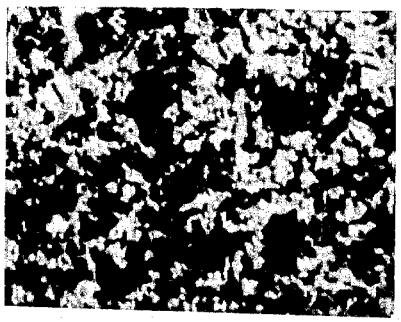
FIG. 25 is a photomicrograph of a chrome silicon product of this invention produced with a hardening temperature of 1500° F.
Figure 26:
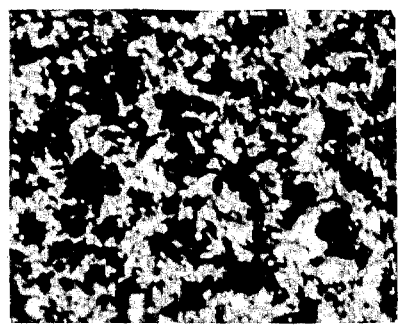
FIG. 26 is a photomicrograph of a chrome silicon product of this invention produced with the hardening temperature of 1550° F.
Figure 27:
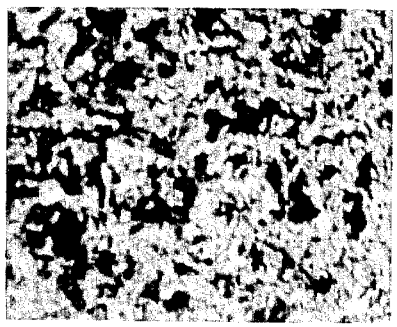
FIG. 27 is a photomicrograph of a chrome silicon product of this invention produced at a hardening temperature of 1600° F.

FIGURES 25, 26 and 27 are photomicrographs originally at 3,300 times magnification of samples of products of Table VI corresponding to hardening temperatures of 1500° F., 1550° F. and 1600° F. respectively. These microstructures show the characteristic which was found to vary with hardening temperature. As was the case with the plain carbon examples, the grain size increased with increasing hardening temperature. The factors to be considered in selecting a hardening temperature were described in connection with the plain carbon examples. Based on these same considerations a hardening temperature of 1550° F. was chosen for the examples of Tables IV and V.

Apparatus as set forth in FIGURE 1 and as described in connection with the chrome silicon steel examples was employed with chrome vanadium steel examples having the following analysis: Carbon .51%; manganese .79%; silicon .20%; chromium 1.01%; vanadium .22%. This steel is within the standard established in the steel industry as SAE 6150. As before, the wire was drawn to 0.0118 inch in diameter.

The $A_c1$ temperature for the chrome vanadium steel is approximately 1380° F. Thus, as was the case with the chrome silicon steel, the appropriate hardening temperature is somewhat higher than for plain carbon steel. Table VII sets forth characteristics obtained with the chrome vanadium steel wire, employing a hardening temperature of 1550° F. and a wire speed of 400 feet per minute. The tempering temperature was varied as noted in the table.

TABLE VII

| Tempering temperature, ° F | 680 | 720 | 760 | 800 | 840 |
|---|---|---|---|---|---|
| Tensile strength in 1,000 lbs./sq. in | 326 | 320 | 303 | 289 | 289 |
| Yield strength in 1,000 lbs./sq. in. | 206 | 252 | 245 | 239 | 269 |
| Yield as percentage of tensile | 63.7 | 78.9 | 81 | 82.6 | 93.2 |
| Percent elongation in 10" | 5.6 | 5.2 | 4.5 | 3.7 | 2.8 |
| Knoop Hardness No | 700 | 690 | 680 | 660 | 640 |
| Fatigue in minutes to failure | 3.5 | 2.3 | 1.9 | 1.4 | 1.5 |
| Percent white constituent | 21.6 | 11.6 | 8.9 | 7.7 | 2.9 |
| Percent retained austenite | 3.7 | ----- | 2.8 | ----- | 2.4 |
| Percent untempered martensite | 18.0 | ----- | 6.2 | ----- | 0.6 |

FIGURE 28 is a chart plotting two characteristics from Table VII against tempering temperature. Yield strength as a percent of ultimate strength and percent white constituent are plotted. From an inspection of Table VII it is apparent that the ultimate strength increased as the tempering temperature was lowered. Furthermore, the yield strength decreased as tensile strength increased so that in the chart of FIGURE 28 it is apparent that the ratio of yield strength to ultimate strength was substantially reduced as the tempering temperature was lowered. It is apparent from FIGURE 28 that good correlation exists between the reduction and the ratio to yield of ultimate strength and the percent of white constituent.

The chrome vanadium steel used to obtain the data plotted in FIGURE 28 is intermediate its resistance to tempering to the plain carbon steels used in the data plotted in FIGURE 3 and the chrome silicon steel used to obtain the data plotted in FIGURE 16. Around 680° F. is still an optimum tempering temperature. Likewise it is also true that lower tempering temperatures than those taught by the prior art are advantageous with the chrome vanadium steel. FIGURES 29, 30 and 31 are photomicrographs, originally at 3,300 times magnification, of samples of products of Table VII corresponding to tempering temperatures of 680° F., 760° F. and 840° F. respectively. As noted earlier, a standard Nital etch was used to prepare all samples. The appearance of the three microstructures reflects the difference in white constituent tabulated in Table VII, that is, approximately 22% for FIGURE 29, 9% for FIGURE 30 and 3% for FIGURE 31. While not distinguishable in the photomicrographs, the character of the white constituent is the same as that discussed in connection with the preceding examples.

Figure 32:
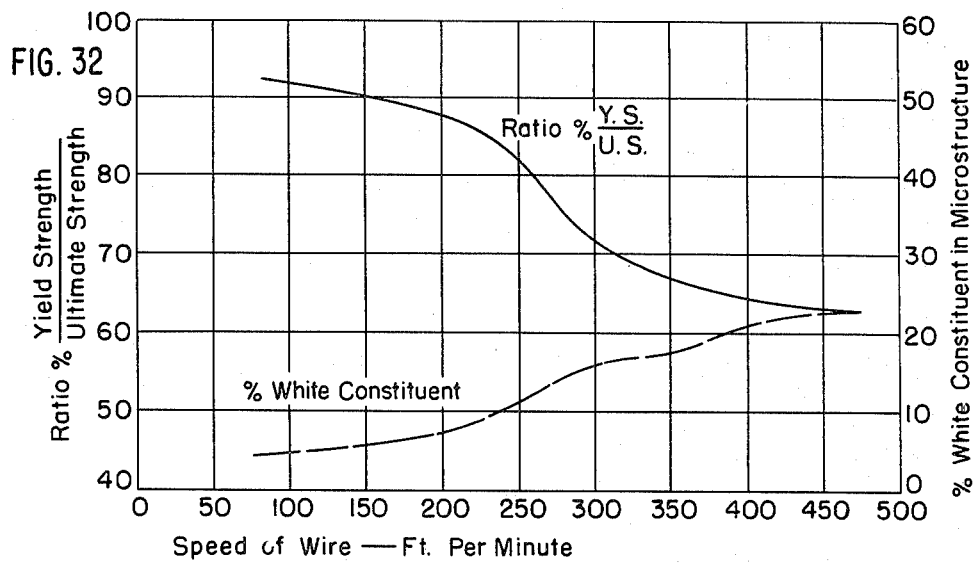
FIG. 32 is a chart showing plots of the ratio of yield strength to ultimate strength and the percent white constituent as a function of wire speed of a chrome vanadium wire processed in accordance with this invention.

Table VIII sets forth characteristics obtained with additional chrome vanadium steel products produced according to the present invention. For these examples the hardening temperature was held at 1550° F. and the tempering temperature was held constant at 680° F. The wire speed was varied from 150 to 450 feet per minute as noted in the table. FIGURE 32 is a chart plotting two characteristics from Table VIII against wire speed. Yield strength as a percentage of ultimate tensile strength and percent white constituent are plotted. Again Table VIII shows that ultimate tensile strength increased and the ratio of yield to ultimate strength decreased with increases in white constituent. FIGURE 32 shows that as the wire speed increases the percentage of white constituent increases and the ratio of yield strength to ultimate strength decreases.

TABLE VIII

| Wire speed in feet per minute | 150 | 200 | 250 | 300 | 350 | 400 | 450 |
| --- | --- | --- | --- | --- | --- | --- | --- |
| Tensile strength in 1,000 lbs./sq. in | 319 | 326 | 326 | 325 | 329 | 343 | 336 |
| Yield strength in 1,000 lbs./sq. in | 287 | 287 | 267 | 231 | 230 | 219 | 202 |
| Yield as percentage of tensile | 90 | 88 | 82 | 71 | 70 | 64 | 63 |
| Percent elongation (10") | 4.1 | 4.7 | 5.1 | 5.3 | 5.8 | 5.9 | 6.8 |
| Knoop Hardness No | 664 | 670 | 678 | 684 | 690 | 706 | 706 |
| Fatigue in minutes to failure | 2.7 | 3.1 | 3.0 | 2.8 | 3.4 | 3.4 | 3.5 |
| Percent white constituent | 5.8 | 6.8 | 10.7 | 16.1 | 17.2 | 21.2 | 22.3 |
| Percent retained austenite | | 3.7 | | 3.9 | | 3.7 | |
| Percent untempered martensite | | 3.2 | | 12.3 | | 17.6 | |

Figure 33:
FIG. 33 is a photomicrograph of a chrome vanadium product of this invention produced at a wire speed of 200 feet per minute.
Figure 34:
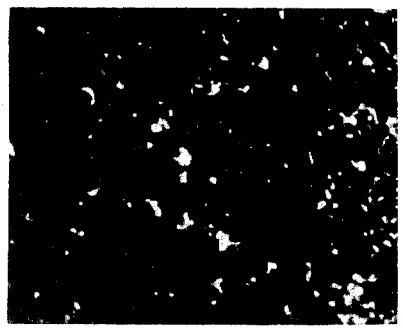
FIG. 34 is a photomicrograph of a chrome vanadium product of this invention produced at a wire speed of 300 feet per minute.
Figure 35:
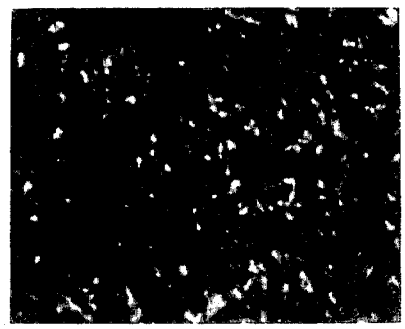
FIG. 35 is a photomicrograph of a chrome vanadium product of this invention produced at a wire speed of 400 feet per minute.

Comparing FIGURES 28 and 32, very good correlation exists between the percent white constituent and the ratio of yield to ultimate strength, as was the case with the above described plain carbon and chrome silicon steel examples. FIGURE 33, FIGURE 34 and FIGURE 35 are photomicrographs, originally at 3,300 times magnification, of the products of Table VIII corresponding to wire speeds of 200, 300 and 400 feet per minute respectively. Again the appearance of the three photographs reflects the difference in white constituent. The percentage is approximately 7% for FIGURE 33; 16% for FIGURE 34 and 21% for FIGURE 35.

The hardening and tempering temperatures used in the chrome vanadium examples of Table VIII were the ones which in the case of the examples of Table VII were found to produce a high percentage of white constituent. Nevertheless, as with the plain carbon and chrome silicon steel examples, there is a substantial variation in the percentage of white constituent. Again this variation is believed to result from the fact that at the slowest speeds more austenite is transformed to martensite in the oil quench and prior to tempering. Also a greater amount of retained austenite is probably transformed to bainite in the tempering step. At 150 and 200 feet per minute, the slowest speeds employed, the percent white constituent has dropped below 10% and the characteristics of the steel begin to approximate that processed by conventional techniques. At 250 feet per minute substantial untransformed martensite begins to remain in the end product. Thus at a wire speed of 250 feet per minute, hardening temperature of 1550° F. and tempering temperature of 680° F. more than 10% white constituent and advantageous processing and product characteristics according to the present invention began to appear.

The following Table IX sets forth characteristics of additional chrome vanadium steel products according to the present invention. The same apparatus and processing technique was used for these examples except that the tempering temperature was held constant at 680° F. and the wire speed was held constant at 400 feet per minute. The hardening temperature was varied from 1500° F. to 1600° F.

TABLE IX

| Hardening temperature, °F | 1,500 | 1,550 | 1,600 |
| --- | --- | --- | --- |
| Tensile strength in 1,000 lbs./sq. in | 320 | 326 | 335 |
| Yield strength in 1,000 lbs./sq. in | 213 | 208 | 201 |
| Yield as percentage of tensile | 66.5 | 63.7 | 60.1 |
| Percent elongation in 10" | 5.0 | 5.6 | 6.1 |
| Knoop Hardness No | 697 | 700 | 700 |
| Fatigue in minutes | 3.3 | 3.5 | 3.3 |
| Percent white constituent | 20 | 21.6 | 23.1 |

FIGURE 36 is a chart plotting two characteristics obtained with the examples of Table IX against hardening temperature. Yield strength as a percent of ultimate tensile strength and percent white constituent are plotted. Relatively high proportions of white constituent were obtained with all products of this table. Accordingly, high ultimate tensile strength and relatively low yield to ultimate strength ratio were obtained for all items. The small variation which does exist consists of a slight increase in ultimate tensile strength and decrease in yield strength and yield to ultimate strength ratios as the hardening temperatures increases.

FIGURES 37, 38 and 39 are photomicrographs originally at 3,300 times magnification of samples of products of Table IX corresponding to hardening temperatures of 1500° F., 1550° F., and 1600° F. respectively. These microstructures show the characteristic which was found to vary with hardening temperature. As was the case with the plain carbon and chrome silicon steel examples, the grain size increased with increasing hardening temperature. Utilizing the same factors considered in selecting a hardening temperature for the plain carbon and chrome silicon steels, a hardening temperature of 1550° was chosen for the examples of Tables VII and VIII.

Considering all examples, it is apparent that the preferred processing characteristics for optimum product characteristics are essentially the same for all of the carbon and low alloy steel examples. Minor modifications were found desirable for particular compositions to accommodate specific steel characteristics, such as slightly differing $A_c1$ and $M_s$ temperatures. These characteristics are well known for all of the standard steels and have been available in standard metallurgical texts for many years. While it is impossible to specify exact processing characteristics, even for a specific composition and wire size, when the process is to be carried on in a different location or new plant, the data set forth above provides a basis for establishing optimum process conditions. It is customary in the steel industry to make process modifications to compensate for pecularities in the instrumentation or other factors of a particular installation. The above data provides a basis for adjusting processing conditions to provide optimum product characteristics according to the present invention.

While it is noted that the product and process characteristics were similar for all examples, there are certain general distinctions. For example, with the chrome silicon steel examples the maximum white constituent was only around one-third of the product microstructure, less than that possible with plain carbon steel. With the chrome vanadium steel examples the maximum ratio of white constituent obtained was still further decreased. FIGURE 40 is a chart containing plots of the ratio of yield strength to ultimate tensile strength as a function of percent white constituent in the microstructure for the plain carbon steel, chrome steel, chrome silicon steel and chrome vanadium steel examples. While, as indicated earlier, there are slight changes in the characteristics, the curves for the three compositions follow the same general pattern. While specific characteristics differ somewhat with composition, advantageous product characteristics begin at about 10% white constituent for all compositions. For some reason not fully understood, the chrome silicon steel curve has a slight S-shape.

In applications suitable for plain carbon steel it will normally be economically advantageous to employ such steels. However, where corrosion resistance or the ability to stand slightly higher temperatures without change in product characteristics is desired, the chrome vanadium or chrome silicon steels may be advantageous. In general, alloys having less than about 3½ percent total alloying elements are suitable. Again the fundamental consideration is that the steel upon a full quench to atmosphereic temperature, at its critical rate of cooling, normally an oil quench, retains less than 10% retained austenite with the remainder primarily martensite. In general these steels are known in the metallurgical art as the low alloy steels and plain carbon steels. Although plain carbon steels with less than about .30% carbon contain less than 10% retained austenite after a full quench, the remainder will not be substantially all martensite but rather will normally contain substantial amounts of ferrite and perhaps other non-martensitic products.

It is also to be understood that the following claims are intended to cover all of the generic and specific features of the invention herein described, and all statements of the scope of the invention, which as a matter of language, might be said to fall therebetween.

I claim:

1. An improved method of hardening and tempering carbon steels of the type characterized by a microstructure containing less than 10% retained austenite with the remainder primarily martensite after complete quenching at its critical rate of cooling to atmospheric temperature from the austenitic state comprising the steps of austenitizing the steel, quenching the steel in a first quench, terminating said first quench before the steel has reached atmospheric temperature, said termination resulting in the retention of a substantial amount of untransformed austenite, tempering the martensite formed during the first quenching step, and cooling the steel to atmospheric temperature, said cooling resulting in the transformation of a substantial amount of the untransformed austenite to untempered martensite.

2. An improved method of hardening and tempering carbon steels of the type characterized by a microstructure containing less than 10% retained austenite with the remainder primarily martensite after complete quenching at its critical rate of cooling to atmospheric temperature from the austenitic state comprising the steps of heating the steel to a temperature above 1350° F. for a time sufficient to substantially completely austenitize the steel, quenching the steel, terminating the quench before the steel has reached atmospheric temperature, said termination resulting in the retention of a substantial amount of untransformed austenite, reheating the steel at a tempering temperature below 800°, and cooling the steel, to atmospheric temperature, said quench partially transforming the austenite to martensite, said heating tempering the martensite formed in said quench and said cooling transforming a substantial amount of the untransformed austenite to untempered martensite to provide an end product having a microstructure comprising a matrix of tempered martensite with a sub-matrix of untempered martensite surrounding retained austenite.

3. An improved method of hardening and tempering carbon steels of the type characterized by a microstructure containing less than 10% retained austenite with the remainder primarily martensite after complete quenching at its critical rate of cooling to atmospheric temperature from the austenitic state comprising the steps of heating the steel to a temperature in the range of approximately 1350° F. to 1550° F. for a time sufficient to substantially completely austenitize the steel, quenching the steel under conditions of temperature and time producing a partial quench, said quench resulting in the retention of a substantial amount of untransformed austenite, reheating the steel at a tempering temperature of approximately 550° F. to 800° F., and cooling the steel to atmospheric temperature, to provide an end product having a microstructure comprising a matrix of tempered martensite with a sub-matrix of untempered martensite surrounding retained austenite.

4. A continuous process for hardening and tempering carbon steel in the form of wire and strip of the type characterized by a microstructure containing less than 10% retained austenite with the remainder primarily martensite after complete quenching at its critical rate of cooling to atmospheric temperature from the austenitic state, comprising the steps of substantially completely austenitizing the steel at a temperature in the range of approximately 1350° F. to 1550° F., passing the steel through a quenching bath to cool the steel at its critical rate of cooling, the temperature of said quenching bath and the rate of advance of the steel in said quenching bath providing conditions of temperature and time producing a partial quench, said quench resulting in the formation of martensite with the retention of a substantial amount of untransformed austenite, passing the steel through a tempering bath, the temperature of the tempering bath being in the range from approximately 550° F. to 800° F., and the rate of advance of the steel being selected to temper the martensite formed in the quench but avoid the production of a substantial percentage of bainite from the untransformed austenite, and cooling the steel to atmospheric temperature to provide an end product having a microstructure comprising a matrix of tempered martensite and a sub-matrix of untempered martensite and retained austenite which is present in an amount exceeding 10% of the microstructure of the steel.

5. In combination with the process of claim 3, the step of subsequently tempering the end product to temper said untempered martensite and thus increase the yield strength of the product.

6. An improved method of hardening and tempering carbon steels of the type characterized by a microstructure containing less than 10% retained austenite with the remainder primarily martensite after complete quenching at its critical rate of cooling to atmospheric temperature from the austenitic state comprising the steps of austenitizing the steel, quenching the steel in a first quench at its critical rate of cooling and at a temperature below the $M_s$ point, the conditions of temperature and time being selected to provide incomplete transformation of the austenite to martensite, said incomplete transformation resulting in the retention of a substantial amount of untransformed austenite, immediately tempering the steel under conditions selected to temper the martensite formed during the first quenching step, and quenching the steel to below the $M_f$ point in a second quench to transform a substantial amount of the untransformed austenite to untempered martensite to provide an end product having a microstructure comprising a matrix of tempered martensite with a sub-matrix of untempered martensite surrounding retained austenite, said sub-matrix comprising from 10% to 55% of the microstructure of the steel.

7. An improved method of hardening and tempering carbon steels of the type characterized by a microstructure containing less than 10% retained austenite with the remainder primarily martensite after complete quenching at its critical rate of cooling to atmospheric temperature from the austenitic state comprising the steps of austenitizing the steel, quenching the steel in a first quench at its critical rate of cooling and at a temperature below the $M_s$ point, the conditions of temperature and time being selected to provide incomplete transformation of the austenite to martensite, said incomplete transformation resulting in the retention of a substantial amount of untransformed austenite, immediately tempering the steel under conditions selected to temper the martensite formed during the first quenching step, and quenching the steel to below the $M_f$ point in a second quench to transform a substantial amount of the untransformed austenite to untempered martensite to provide an end product having a microstructure comprising a matrix of tempered martensite with a sub-matrix of untempered martensite surrounding retained austenite, said sub-matrix comprising from 10% to 55% of the microstructure of the steel and said steel having a ratio of the yield to ultimate strength of the end product no greater than 75%.

8. In a process for hardening and tempering carbon steel of the type characterized by microstructure containing less than 10% retained austenite with the remainder primarily martensite after complete quenching at its critical rate of cooling to atmospheric temperature from the austenitic state in which the steel is sequentially hardened, quenched, and tempered, means for controlling the yield strength of the end product comprising substantially completely austenitizing the steel in the hardening step, controlling the quenching step to provide a partial quench, said quench resulting in the retention of a substantial amount of untransformed austenite, the remainder of the microstructure comprising primarily martensite, controlling the tempering step to temper the martensite formed in the quench and retain a substantial percentage of the untransformed austenite to provide an end product comprising a substantial amount of both tempered and untempered martensite, and subsequently tempering the end product to temper said untempered martensite and thus increase the yield strength of the product.

9. An improved steel of the type capable of forming a microstructure containing less than 10% of retained austenite with the remainder primarily martensite after complete quenching at its critical rate of cooling to atmospheric temperature from the austenitic state, said steel having a microstructure comprising a matrix of tempered martensite and a sub-matrix of untempered martensite and retained austenite which is present in an amount exceeding 10% of the microstructure of the steel.

10. A steel as described in claim 9 in which the yield strength of the steel may be increased by tempering the steel.

11. An improved carbon steel of the type capable of forming a microstructure containing less than 10% retained austenite with the remainder primarily martensite after complete quenching at its critical rate of cooling to atmospheric temperature from the austenitic state, said steel having a microstructure comprising a matrix of tempered martensite and a sub-matrix of untempered martensite and retained austenite which is present in an amount exceeding 10% of the microstructure of the steel and in which the yield strength is less than 75% of the ultimate strength of the steel.

12. A steel as described in claim 11 in which the yield strength of the steel may be increased by tempering the steel.

13. An improved low alloy steel containing not more than 3½% of alloying elements and of the type capable of forming a microstructure containing less than 10% retained austenite with the remainder primarily martensite after complete quenching at its critical rate of cooling to atmospheric temperature from the austenitic state, said steel having a microstructure comprising a matrix of tempered martensite and a sub-matrix of untempered martensite and retained austenite which is present in an amount exceeding 10% of the microstructure of the steel, the yield strength of said steel being less than 85% of the ultimate strength of the steel.

14. A steel as described in claim 13 in which the yield strength of the steel may be increased by tempering of the steel.

15. An improved chrome silicon steel of the type capable of forming microstructure containing less than 10% retained austenite with the remainder primarily martensite after complete quenching at its critical rate of cooling to atmospheric temperature from the austenitic state, said steel having a microstructure comprising a matrix of tempered martensite and a sub-matrix of untempered martensite and retained austenite which is present in an amount exceeding 10% of the microstructure of the steel.

16. An improved chrome silicon steel of the type set forth in claim 15 having a ratio of yield strength to ultimate strength of less than 85% and in which the yield strength of the steel may be increased by tempering the steel.

17. An improved chrome vanadium steel of the type capable of forming a microstructure containing less than 10% retained austenite with the remainder primarily martensite after complete quenching at its critical rate of cooling to atmospheric temperature from the austenitic state, said steel having a microstructure comprising a matrix of tempered martensite and a sub-matrix of untempered martensite and retained austenite which is present in an amount exceeding 10% of the microstructure of the steel.

18. A steel as described in claim 17 having a ratio of yield strength to ultimate strength of less than 85% and in which the yield strength of the steel may be increased by tempering of the steel.

19. An improved method of hardening and tempering steels containing less than 3½% of alloying elements and of the type characterized by a microstructure containing less than 10% retained austenite with the remainder primarily martensite after complete quenching at its critical rate of cooling to atmospheric temperature from the austenitic state comprising the steps of austenitizing the steel, quenching the steel in a first quench, terminating said first quench before the steel has reached atmospheric temperature, said termination resulting in the retention of a substantial amount of untransformed austenite, tempering the martensite formed during the first quenching step, and cooling the steel to atmospheric temperature, said cooling resulting in the transformation of a substantial amount of the untransformed austenite to untempered martensite.

20. An improved method of hardening and tempering steels containing less than 3½% of alloying elements and of the type characterized by a microstructure containing less than 10% retained austenite with the remainder primarily martensite after complete quenching at its critical rate of cooling to atmospheric temperature from the austenitic state comprising the steps of heating the steel to a temperature above 1350° F. for a time sufficient to substantially completely austenitize the steel, quenching the steel, terminating the quench before the steel has reached atmospheric temperature, said termination resulting in the retention of a substantial amount of untransformed austenite, reheating the steel at a tempering temperature below 800° F., and cooling the steel, to atmospheric temperature, said quench partially transforming the austenite to martensite, said heating tempering the martensite formed in said quench and said cooling transforming a substantial amount of the untransformed austenite to untempered martensite to provide an end product having a microstructure comprising a matrix of tempered martensite with a sub-matrix of untempered martensite surrounding retained austenite.

21. An improved method of hardening and tempering carbon and low alloy steels containing less than 3½% total alloying elements and of the type characterized by a microstructure containing less than 10% retained austenite with the remainder primarily martensite after complete quenching at its critical rate of cooling to atmospheric temperature from the austenitic state comprising the steps of heating the steel to a temperature in the range of approximately 1350° F. to 1600° F. for a time sufficient to substantially completely austenitize the steel, quenching the steel under conditions of temperature and time producing a partial quench, said quench resulting in the retention of a substantial amount of untransformed austenite, reheating the steel at a tempering temperature of approximately 550° F. to 850° F., and cooling the steel to atmospheric temperature, to provide an end product having a microstructure comprising a matrix of tempered martensite with a submatrix of untempered martensite surrounding retained austenite.

22. A continuous process for hardening and tempering carbon and low alloy steels containing less than 3½% total alloying elements and in the form of wire and strip of the type characterized by a microstructure containing less than 10% retained austenite with the remainder primarily martensite after complete quenching at its critical rate of cooling to atmospheric temperature from the austenitic state, comprising the steps of substantially completely austenitizing the steel at a temperature in the range of approximately 1350° F. to 1600° F., passing the steel through a quenching bath to cool the steel at its critical rate of cooling, the temperature of said quenching bath and the rate of advance of the steel in said quenching bath providing conditions of temperature and time producing a partial quench, said quench resulting in the formation of martensite with the retention of a substantial amount of untransformed austenite, passing the steel through a tempering bath, the temperature of the tempering bath being in the range from approximately 550° F. to 850° F., and the rate of advance of the steel being selected to temper the martensite formed in the quench but avoid the production of a substantial percentage of bainite from the untransformed austenite, and cooling the steel to atmospheric temperature to provide an end product having a microstructure comprising a matrix of tempered martensite and a sub-matrix of untempered martensite and retained austenite which is present in an amount exceeding 10% of the microstructure of the steel.

23. An improved method of hardening and tempering carbon and low alloy steels containing less than 3½% total alloying elements and of the type characterized by a microstructure containing less than 10% retained austenite with the remainder primarily martensite after complete quenching at its critical rate of cooling to atmospheric temperature from the austenitic state comprising the steps of austenitizing the steel, quenching the steel in a first quench at its critical rate of cooling and at a temperature below the $M_s$ point, the conditions of temperature and time being selected to provide incomplete transformation of the austenite to martensite, said incomplete transformation resulting in the retention of a substantial amount of untransformed austenite, immediately tempering the steel under conditions selected to temper the martensite formed during the first quenching step, and quenching the steel to below the $M_f$ point in a second quench to transform a substantial amount of the untransformed austenite to untempered martensite to provide an end product having a microstructure comprising a matrix of tempered martensite with a sub-matrix of untempered martensite surrounding retained austenite, said sub-matrix comprising from 10% to 55% of the microstructure of the steel.

References Cited by the Examiner

Castleman et al.: "Effect of Retained Austenite Upon Mechanical Properties," ASM Reprint No. 21, 1951, page 15.

Lemert et al.: "The Dimensional Stability of Steel, Part 4, Tool Steels," ASM Reprint No. 2, 1948. Pages 21–22, 26.

The Iron Age, March 23, 1944, pages 42–56.

DAVID L. RECK, *Primary Examiner.*

HYLAND BIZOT, *Examiner.*